(12) United States Patent
Shanelaris

(10) Patent No.: US 12,013,595 B2
(45) Date of Patent: Jun. 18, 2024

(54) EYEWEAR WITH MULTI-AXIS SIDE ARMS

(71) Applicant: Peter Shanelaris, Meredith, NH (US)

(72) Inventor: Peter Shanelaris, Meredith, NH (US)

( * ) Notice: Subject to any disclaimer, the term of this patent is extended or adjusted under 35 U.S.C. 154(b) by 506 days.

(21) Appl. No.: 17/309,524

(22) PCT Filed: Dec. 6, 2019

(86) PCT No.: PCT/US2019/064898
§ 371 (c)(1),
(2) Date: Jun. 3, 2021

(87) PCT Pub. No.: WO2020/118164
PCT Pub. Date: Jun. 11, 2020

(65) Prior Publication Data
US 2022/0004021 A1    Jan. 6, 2022

Related U.S. Application Data

(60) Provisional application No. 62/776,530, filed on Dec. 7, 2018.

(51) Int. Cl.
*G02C 5/22* (2006.01)
*G02C 5/14* (2006.01)

(52) U.S. Cl.
CPC .......... *G02C 5/146* (2013.01); *G02C 5/2209* (2013.01); *G02C 5/2263* (2013.01)

(58) Field of Classification Search
None
See application file for complete search history.

(56) References Cited

U.S. PATENT DOCUMENTS

| | | | | |
|---|---|---|---|---|
| 1,970,196 A | * | 8/1934 | Rodemeyer | E05F 5/08 16/257 |
| 4,673,376 A | | 6/1987 | Fender | |
| 5,229,795 A | * | 7/1993 | Heintzelman | G02C 5/2263 351/120 |
| 5,596,789 A | * | 1/1997 | Simioni | G02C 5/2209 403/135 |

(Continued)

FOREIGN PATENT DOCUMENTS

JP    4609795 B2    1/2011

OTHER PUBLICATIONS

International Search Report and Written Opinion of International Application No. PCT/US2019/064898, dated Feb. 4, 2020, 10 pages.

*Primary Examiner* — Darryl J Collins
(74) *Attorney, Agent, or Firm* — Grossman, Tucker, Perreault & Pfleger PLLC; Paul J. Kroon, Jr.

(57) ABSTRACT

A joint for coupling a side arm to a frame of a pair of glasses. The joint includes a post, a plurality of prongs, and optionally a nut. The post is configured to be secured to one of the side arm or the frame and the plurality of prongs are configured to be secured to the other of the side arm or the frame. The post includes a shaft and an enlarged head at a distal end of the shaft. The plurality of prongs define a socket configured to receive at least a portion of the enlarged head of the post and apply a compressive force against the enlarged head of the post. The nut may be configured to generate a compressive force against the plurality of prongs. The compressive force may be adjusted by threading the nut along the length of the prongs. The nut may threadably engage a base that the prongs extend from and/or the prongs.

17 Claims, 31 Drawing Sheets

(56) References Cited

U.S. PATENT DOCUMENTS

| | | | | |
|---|---|---|---|---|
| 5,627,608 | A * | 5/1997 | Chao | G02C 5/2227 |
| | | | | 351/113 |
| 7,175,270 | B2 * | 2/2007 | Curci | G02C 11/08 |
| | | | | 351/41 |
| 7,264,349 | B1 * | 9/2007 | Ku | G02C 5/2263 |
| | | | | 351/120 |
| 7,513,617 | B1 * | 4/2009 | Alford | G02C 5/2263 |
| | | | | 351/63 |
| 7,566,127 | B2 * | 7/2009 | Breda | G02C 5/006 |
| | | | | 351/63 |
| 7,791,356 | B2 | 6/2010 | Gilbert | |
| 9,229,245 | B2 * | 1/2016 | Carter | G02C 5/2209 |
| 9,726,900 | B1 * | 8/2017 | Holzer | G02C 5/006 |
| 11,042,043 | B1 * | 6/2021 | Ginocchio | G02C 5/146 |
| 2011/0094977 | A1 | 4/2011 | Li et al. | |
| 2012/0307198 | A1 | 12/2012 | Ifergan | |
| 2021/0033884 | A1 * | 2/2021 | Guerin | G02C 5/2254 |

* cited by examiner

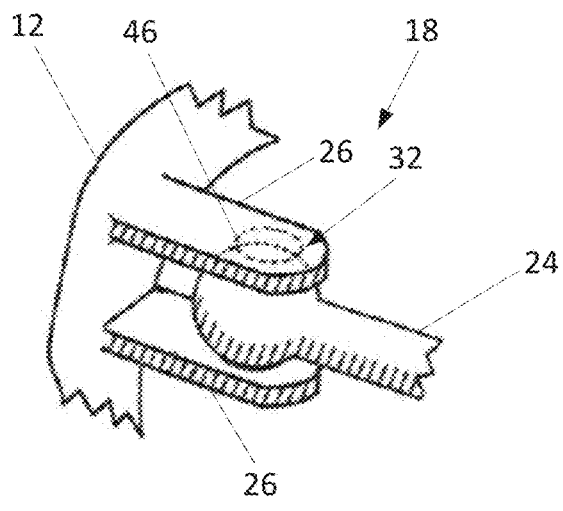
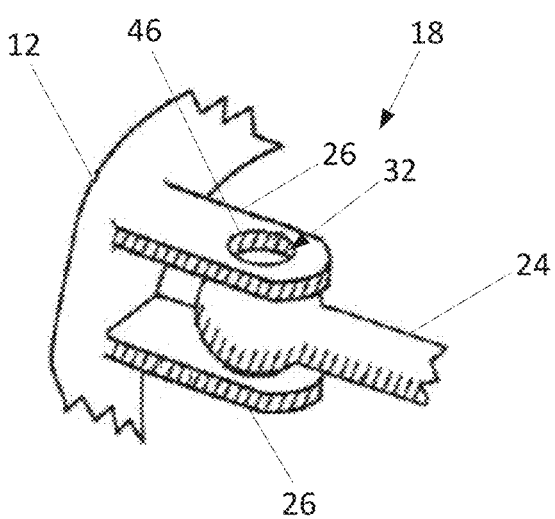
FIG. 5  FIG. 6
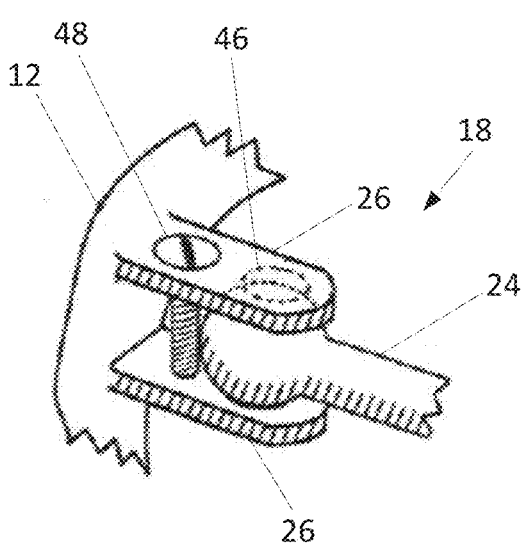
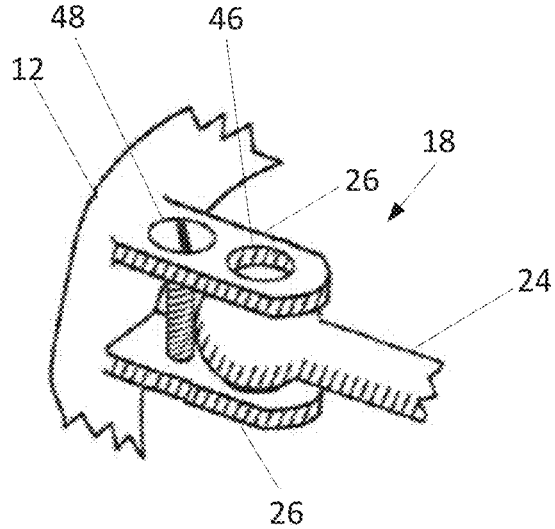
FIG. 7  FIG. 8

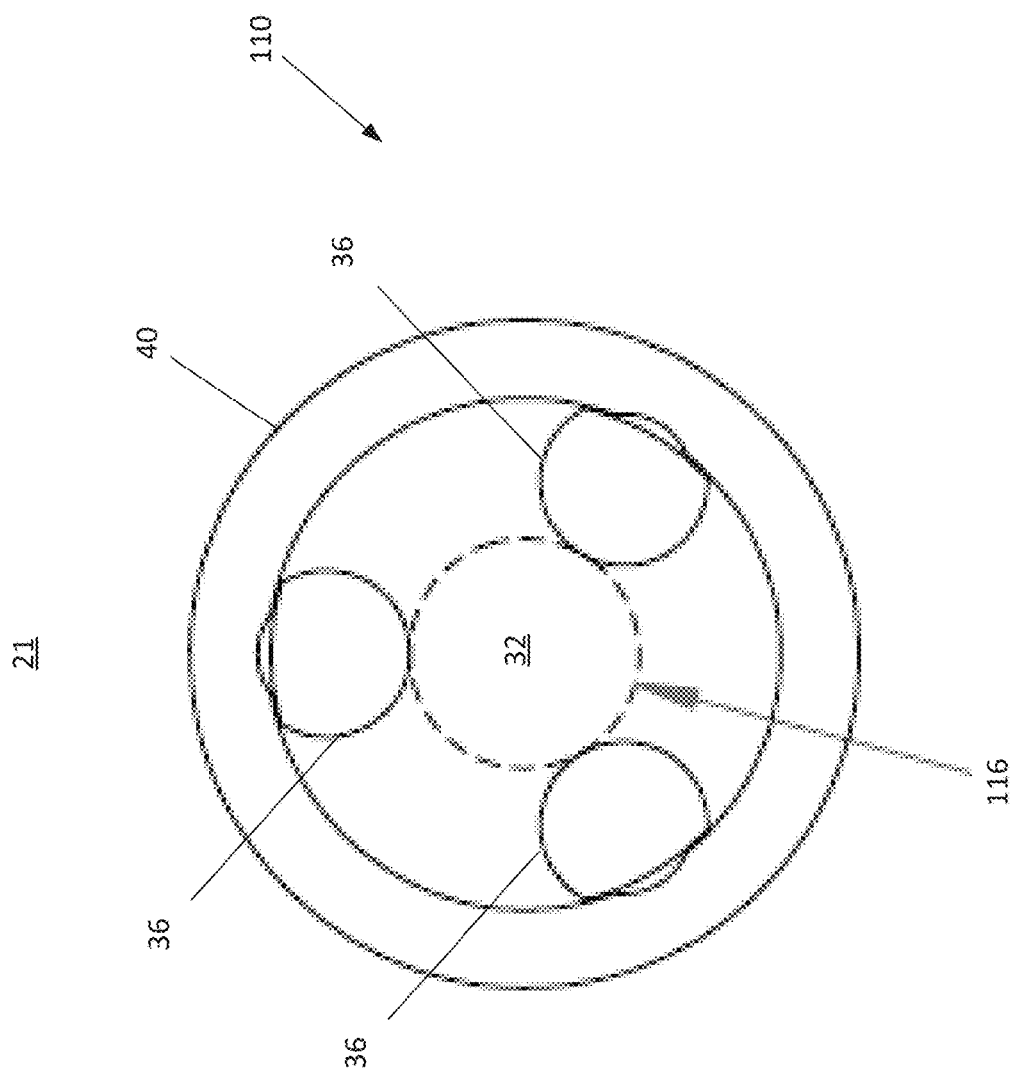

EYEWEAR WITH MULTI-AXIS SIDE ARMS

CROSS REFERENCE TO RELATED APPLICATIONS

This application claims the benefit of U.S. Provisional Application No. 62/776,530, filed Dec. 7, 2018, the entire disclosure of which is incorporated herein by reference.

TECHNICAL FIELD

The present disclosure relates generally to eyewear, and more particularly, to eyewear having side arms movable in multiple axes.

BACKGROUND

Eyewear (such as sunglasses, reading glasses, safety glasses, and the like) may generally include a frame coupled to one or more lenses, and one or more side arms coupled to the frame. Eyewear has often focused on creating a rigid configuration that maintains stability to render constant proper optical and cosmetic alignment. To ensure a proper fit, the side arms need to be adjusted to a correct position relative to the frame when in extended position. The adjustment of the side arms may require mechanical deformation of the side arms. For example, a person may have to apply a force to the side arms (often along with heat) to bend the side arms. Too much force and/or too much heat may damage the side arms and/or frame. As may be appreciated, many users are not comfortable bending and/or heating their eyewear, and as a result, must take their eyewear to a specialist to make the necessary adjustments. Having to take eyewear to a specialist costs time and money. Moreover, repeated adjustments may need to be frequently performed to account for deformations of the side arms during normal use and/or accidental bending. The repeated bending and/or heating of the side arms may fatigue the side arms and/or frame, ultimately causing the side arms and/or frame to either lose the ability to maintain the desired shape and/or ultimately catastrophic failure of the side arms and/or frame.

Accordingly, what is needed is an eyewear design that allows a user to customize the shape of the eyewear to the particular user's need. The eyewear should allow for easy and instantaneous adjustment to the shape of the eyewear for secure and proper optical and/or cosmetic orientation, without the need for tools and/or technical assistance. The eyewear may also allow for non-traditional configurations such as, but not limited to, a side arm extending outwardly away from a user's head. The eyewear may also prevent the side arms from applying too much pressure to the wearer's head, reducing discomfort normally associated with traditional frames.

BRIEF DESCRIPTION OF THE DRAWINGS

Embodiments are illustrated by way of example in the accompanying figures, in which like reference numbers indicate similar parts, and in which:

FIG. 5 generally illustrates another example of a joint, consistent with at least one example of the present disclosure;

FIG. 6 generally illustrates one example of the joint of FIG. 5 having a recessed region with an aperture extending completely through a prong, consistent with at least one example of the present disclosure;

FIG. 7 generally illustrates one example of the joint of FIG. 5 having a biasing fastener, consistent with at least one example of the present disclosure;

FIG. 8 generally illustrates one example of the joint of FIG. 6 having a biasing fastener, consistent with at least one example of the present disclosure;

FIG. 31A-31B generally illustrate front views of the prong assembly showing the socket configured to receive at least a portion of the post, consistent with at least one example of the present disclosure;

DETAILED DESCRIPTION

While the making and using of various embodiments of the present disclosure are discussed in detail below, it should be appreciated that the present disclosure provides many applicable inventive concepts that can be embodied in a wide variety of specific contexts. The specific embodiments discussed herein are merely illustrative of specific ways to make and use the disclosure and do not limit the scope of the disclosure.

Figure 1:
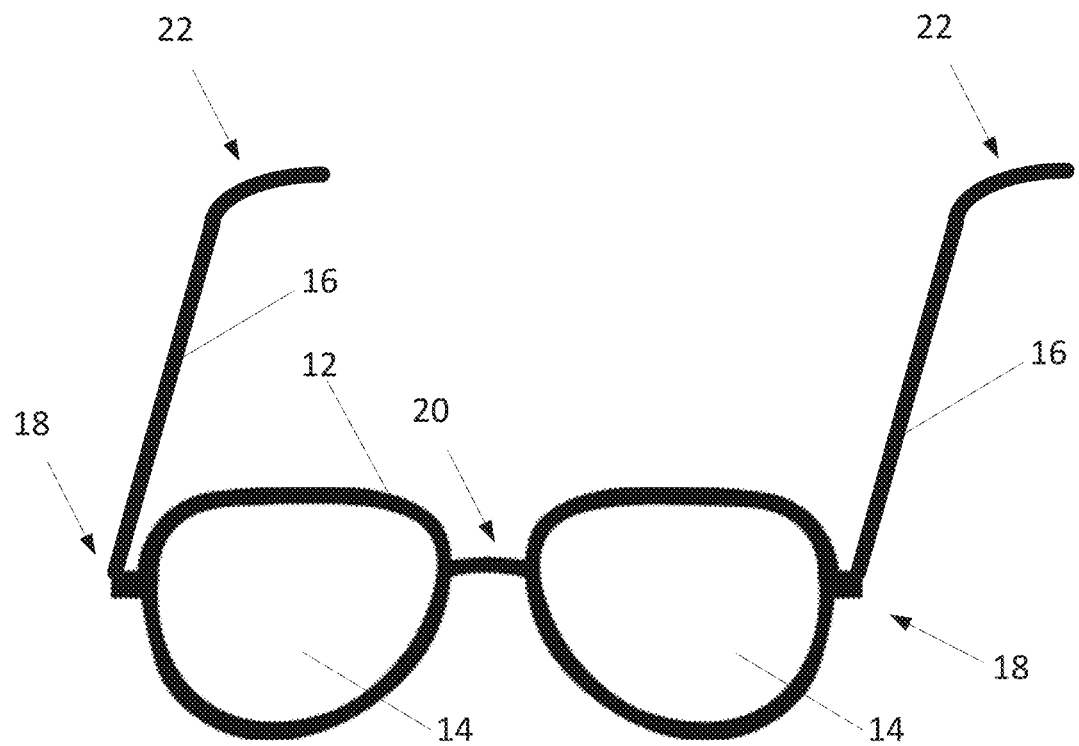
FIG. 1 generally illustrates one example of a pair of glasses, consistent with at least one example of the present disclosure.

Turning now to FIG. 1, one embodiment of a pair of glasses 10 is generally illustrated. The term "glasses" as used herein is intended to include all types of eyeglasses or spectacles including, but not limited to, sunglasses, prescription glasses, reading glasses, plano glasses, safety glasses, wind glasses, computer glasses (e.g., but not limited to, virtual reality glasses/headsets), 3D glasses, goggle type glasses, and the like. As described herein, the glasses 10 may include one or more frames 12, one or more lenses 14, and one or more side arms 16. At least one of the side arms 16 may be movably coupled to the frame 12 using one or more joints 18. The frame 12 may optionally include a nose piece and/or nose bridge 20 and the side arm 16 may optionally include an ear piece 22. The glasses 10 may be made from any material such as, but not limited to, glass, plastic, metal, carbon fiber, fiber glass, wood, composite materials, acetate, and/or combinations of the like.

Various examples of the joints 18 disclosed herein may allow for more than 300 degrees of vertical articulation, 270 degrees of horizontal articulation, and more than 100 degrees of diagonal articulation of the side arms 16 relative to the frame 12. It should be appreciated that the present disclosure is not limited to these particular articulation ranges unless specifically claimed as such. Additionally, the side arms 16 may be easily replaced in the event of damage and/or for cosmetic reasons. Moreover, the side arms 16 may be moved out of the wearer's way (e.g., extending away from a wearer's head), for example, for grooming purposes, while still allowing the wearer to see through the lenses 14.

While the glasses 10 are illustrated having one frame 12, two lenses 14, two side arms 16, and two joints 18, it should be appreciated that this is for exemplary purposes only, and that glasses 10 consistent with the present disclosure may include more than one frame 12 and/or only a single lens 14, side arm 16, and/or joint 18. Additionally, glasses 10 consistent with the present disclosure may not include all the features shown in FIG. 1 and/or may include additional features not shown in FIG. 1. For example, the glasses 10 may include adjustable nose pads.

Figure 2:
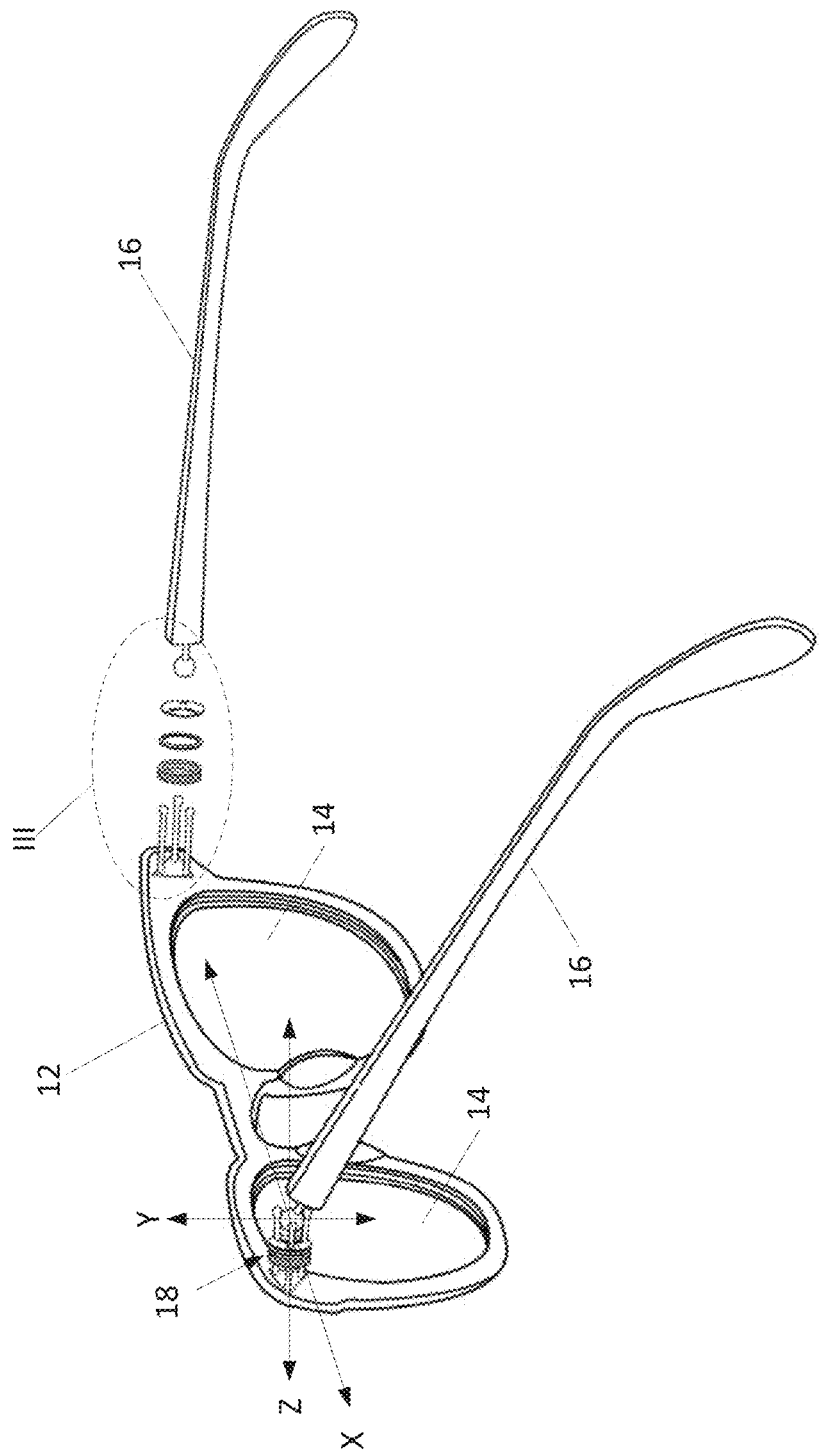
FIG. 2 generally illustrates a pair of glasses including one aspect of a joint, consistent with at least one example of the present disclosure.

Turning now to FIG. 2, one example of glasses 10 including one aspect of the joint 18 is generally illustrated. As explained herein, the joint 18 may be configured to allow a user to easily and repeatedly articulate the side arm 16 relative to the frame 12 to a desired position without risk of damaging the frame 12 and/or side arms 16, and without the need for tools or special instruction. According to at least one aspect, the joint 18 may be configured to allow a side arm 16 to move and/or articulate in three axes. For example, the joint 18 may be configured to allow a side arm 16 to move and/or articulate in the X-axis, the Y-axis, and the Z-axis relative to the frame 12. As used herein, the X-axis is defined as extending generally left/right when the glasses 10 are worn by a user (e.g., generally along a length of the frame 12 between the two side arms 16), the Y-axis is defined as extending generally up/down when the glasses 10 are worn by a user (e.g., generally along a height of the frame 12), and the Z-axis is defined as extending front/back when the glasses 10 are worn by a user (e.g., generally perpendicular to the x and y axes). The X, Y, and Z axes may also be referred to as the pitch, yaw, and roll axes.

Figure 3:
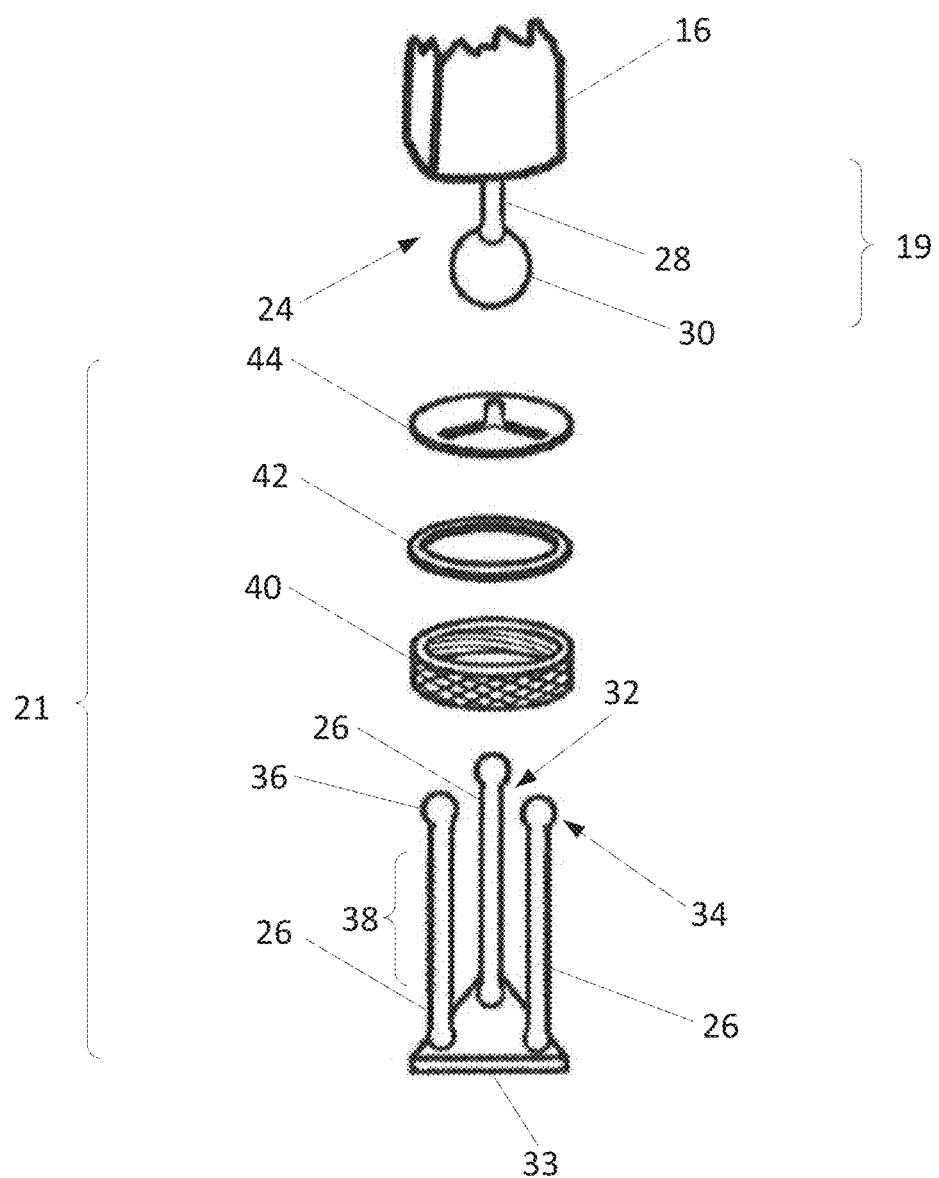
FIG. 3 generally illustrates an exploded view of the joint in region III of FIG. 2.
Figure 4:
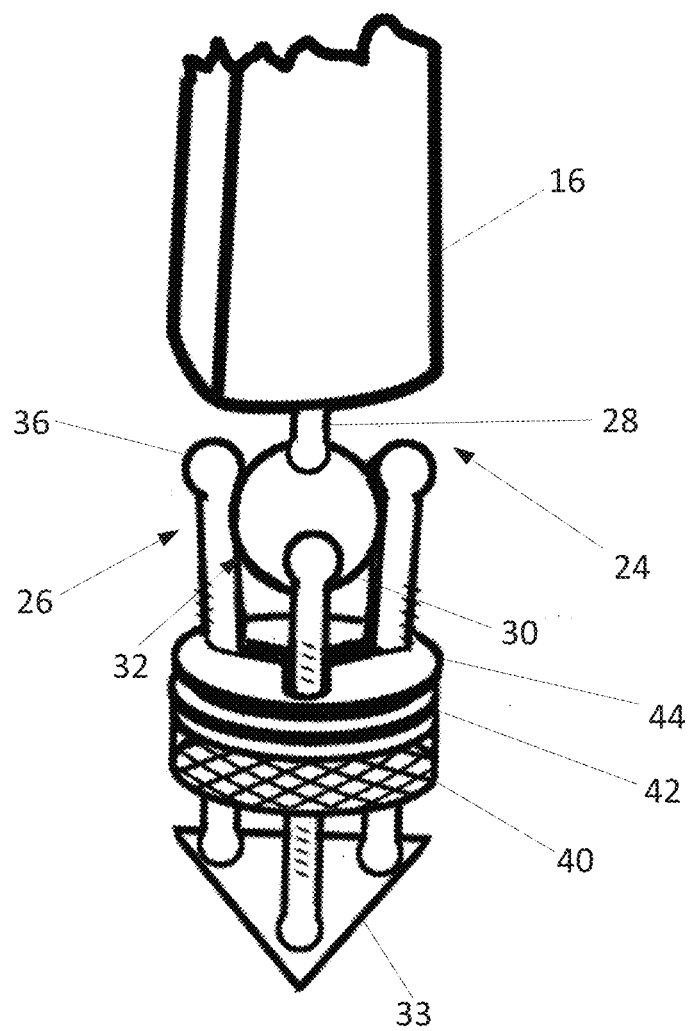
FIG. 4 generally illustrates an assembled view of the joint of FIG. 3.
Figure 23:
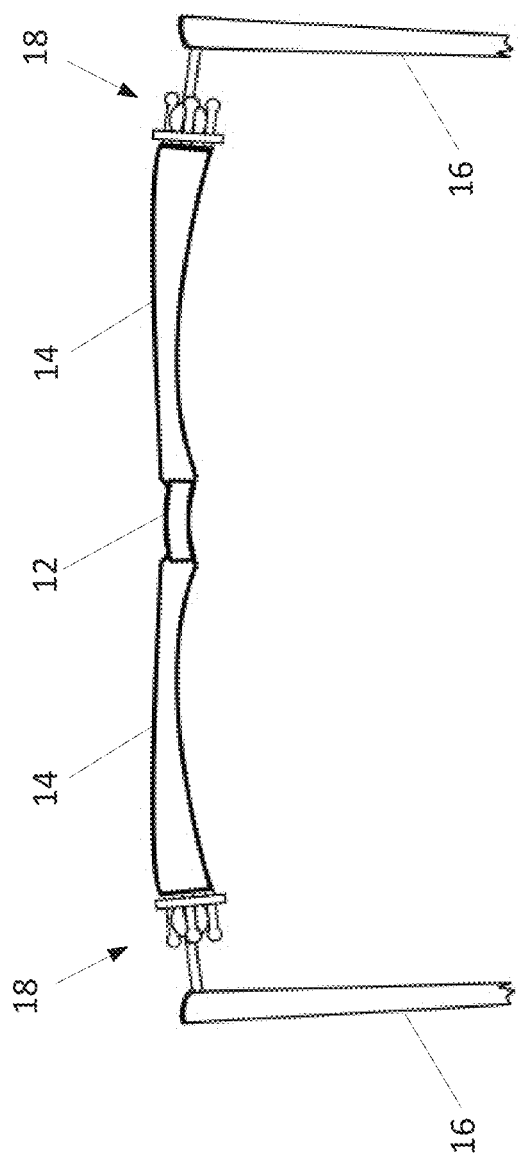
FIG. 23 is another aspect of the joint of FIG. 2, consistent with at least one example of the present disclosure.

With reference to FIGS. 3 and 4, FIG. 3 generally illustrates close-ups of the joint 18 of FIG. 2 are generally illustrated. In particular, FIG. 3 generally illustrates an exploded view of the joint 18 in region III of FIG. 2 and FIG. 4 generally illustrates an assembled view of the joint 18 of FIG. 3. The joint 18 may include a post assembly 19 and a prong assembly 21. The post assembly 19 may include at least one post 24 and the prong assembly 21 may include a plurality of spaced apart prongs 26. In the illustrated embodiment, the post assembly 19 is coupled to the side arm 16 (e.g., the post 24 extends from the side arm 16) and the prong assembly 21 is coupled to the frame 12 (the plurality of prongs 26 extend from the frame 12); however, it should be appreciated that the orientation of the post assembly 19 and the prong assembly 21 relative to the side arm 16 and the frame 12 may be reversed. In addition, the post 24 and/or the prongs 26 may be aligned in any orientation relative to the frame 12 and/or the sidearms 16 as generally illustrated in, e.g., FIG. 23.

The post assembly 21 may include one or more posts 24. The posts 24 may include a shaft 28 and an enlarged head 30. The post 24 may be permanently or removably coupled (e.g., but not limited to, threadably coupled) to the side arm 16. The enlarged head 30 may have a transverse cross-section (i.e., a cross-section which is transverse to the longitudinal axis of the shaft 28) which is larger than the transverse cross-section of the shaft 28. For example, the enlarged head 30 may have a diameter that is larger than a diameter of the shaft 28, though it should be appreciated that the shaft 28 and the enlarged head 30 are not limited circular transverse cross-sections unless specifically claimed as such. The enlarged head 30 may be disposed at a distal most end of the shaft 28.

The prong assembly 21 may include a plurality of prongs 26. The plurality of prongs 26 may define a socket 32 configured to receive at least a portion of the post 24. In the illustrated embodiment, the plurality of prongs 26 include three prongs 26 arranged in a generally triangular configuration, though it should be appreciated that the joint 18 may include more than three prongs 26. The prongs 26 may be permanently or removably coupled (e.g., but not limited to, threadably coupled) to the frame 12. In the illustrated embodiment, the prongs 26 are optionally coupled to a base 33, which in turn, may alternatively or additionally be coupled to the frame 12. An end region 34 of the prongs 26 may define the socket 32. In the illustrated example, the end region 34 may include an enlarged head 36. Similar to the enlarged head 30, enlarged head 36 may have a transverse cross-section (i.e., a cross-section which is transverse to the longitudinal axis of the prong 26) which is larger than the transverse cross-section of the prong 26. For example, the enlarged head 36 may have a diameter that is larger than a diameter of the prong 26, though it should be appreciated that the prong 26 and the enlarged head 36 are not limited circular transverse cross-sections unless specifically claimed as such. The enlarged head 36 may be disposed at a distal most end of the prong 26. The enlarged heads 36 of the plurality of prongs 26 may collectively define the socket 32 which is sized and shaped to receive and retain the enlarged head 30 of the post 24 therein. As such, the enlarged heads 36 of the plurality of prongs 26 may collectively define a socket 32 having a cross-sectional dimension substantially corresponding to the cross-sectional dimension (e.g., diameter) of the enlarged head 30 of the post 24. Optionally, the enlarged heads 36 of the plurality of prongs 26 may collectively define a socket 32 having an opening configured to allow the shaft 28 to pass therethrough and configured to allow the shaft 28 to articulate relative to the prongs 26. While the prongs 26 are shown having a plurality of enlarged heads 36 defining the socket 32, it should be appreciated that the socket 32 may be defined by one or more recesses (not shown) formed in the prongs 26 (e.g., an end region 34).

The prongs 26 may be formed from a resiliently bendable and/or resiliently deformable material. Non-limiting examples of a resiliently bendable and/or resiliently deformable material include steel (e.g., stainless steel), aluminum, titanium, alloys of steel, aluminum, and/or titanium, plastics, or the like. The prongs 26 may be configured to create a socket 32 having a cross-sectional dimension which is slightly smaller than the cross-sectional dimension (e.g., diameter) of the enlarged head 30 of the post 24. As a result, the enlarged head 30 which force the prongs 26 outwardly, thus generating a compressive force against the enlarged head 30 which may generally retain the enlarged head 30 in a desired orientation (e.g., angle) relative to the prongs 26.

Alternatively (or in addition), one or more of the prongs 26 may include a threaded region 38. The threaded region 38 may be disposed around (e.g., circumferentially around) the periphery of a portion of the prong 26 and/or along only an outer region of the prong 26. One or more of the threaded regions 38 may be configured to threadably engage a nut 40. The nut 40 (which may optionally include a knurled nut) may be advanced along the prongs 26 to increase or decrease the compressive force generated by the prongs 26. In particular, advancing the nut 40 toward the distal end region 34 may increase the compressive force by urging the prongs 26 towards one another and towards the enlarged head 30. Conversely, advancing the nut 40 towards the frame 12 and/or base 33 may reduce the compressive force by allowing the prongs 26 to more easily bend away from the enlarged head 30.

The joint 18 may optionally include one or more collars, washers, or bushings 42 and/or washers or spacers 44. The bushing 42 may be configured to reduce twisting motion from the nut 40 against the spacer 44. The bushing 42 may include a threaded portion configured to threadably engage the threaded region 38 of one or more the prongs 26 and may optionally be used to adjust the compressive force generated by the prongs 26. For example, the interaction of the bushing 42 and the nut 40 may generally prevent the nut 40 and/or collar 42 from accidentally becoming loose during use. In particular, tightening the bushing 42 down and then tightening the nut 40 on top of it achieves a locking effect which reduces the likelihood of self-loosening. The spacer 44 may be configured to maintain the desired spatial relationship between the plurality of prongs 26. For example, the spacer 44 may include a plurality of slits or grooves, each configured to receive a respective one of the prongs 26. The spacer 44, and specifically the slits or grooves, may generally prevent the prongs 26 from twisting or bending towards and/or away from each other as the compressive force is increased (e.g., due to tightening the nut 40 and/or bushing 42).

Turning now to FIG. 5, another example of a joint 18 consistent with at least one aspect of the present disclosure is generally illustrated. Rather than having three or more prongs 26 as generally illustrated in FIGS. 2-4, the joint 18 of FIG. 5 may include one or more pairs of prongs 26. One or more pairs of prongs 26 may include one or more recessed region 46 configured to form a socket 32 configured to receive the enlarged head 30 of a post 24 as described herein. One or more of the recessed regions 46 may include a cavity extending partially into a prong 26 as shown in FIG. 5 and/or one or more of the recessed region 46 may include an aperture extending completely through a prong 26 as shown in FIG. 6. Optionally, the joints 18 of FIGS. 5 and/or 6 may include one or more biasing fastener 48 as generally illustrated in FIGS. 7 and 8. The biasing fastener 48 may include a bolt or the like, and may extend from one of the prongs 26 to the opposite prong 26 of the pair. By threading the biasing fastener 48, the compressive force generated by the pair of prongs 26 may be adjusted. While the joint 18 of FIGS. 5-8 is shown with only one pair of prongs 26, it should be appreciated that the joint 18 may include multiple pairs of prongs 26, which may optionally include one or more biasing fasteners 48. Additionally, it should be appreciated that the orientation of the post 24 and the prongs 26 relative to the side arm 16 and the frame 12 may be reversed.

Figure 9:
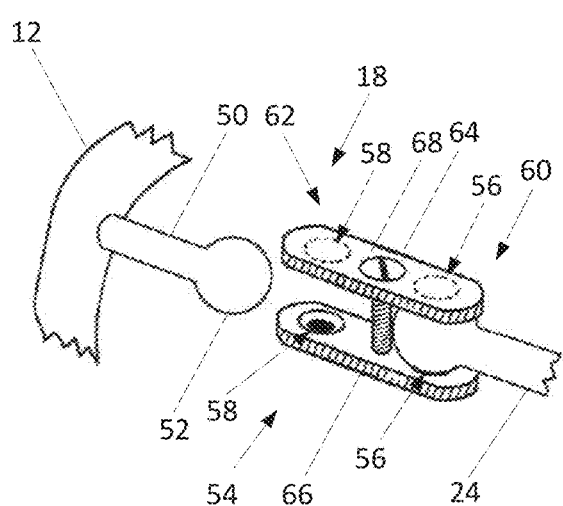
FIG. 9 generally illustrates a further example of a joint, consistent with at least one example of the present disclosure.
Figure 10:
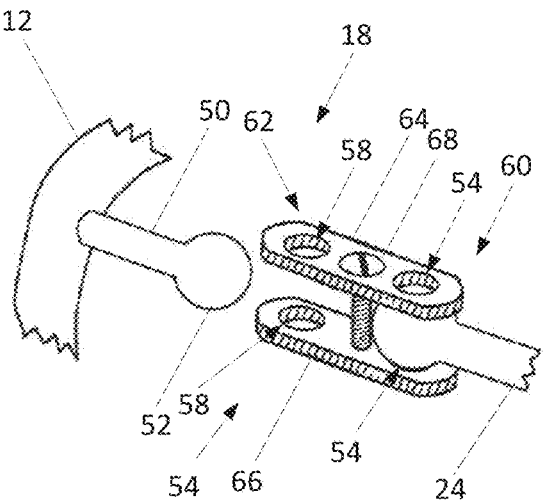
FIG. 10 generally illustrates one example of the joint of FIG. 9 having a recessed region with an aperture extending completely through a prong, consistent with at least one example of the present disclosure.
Figure 11:
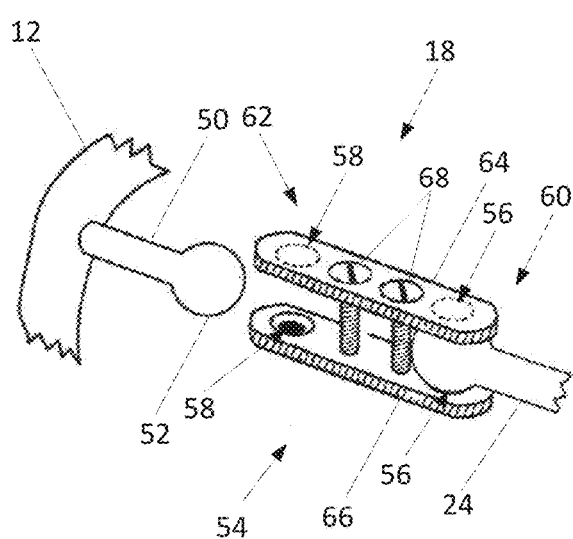
FIG. 11 generally illustrates one example of the joint of FIG. 9 having a biasing fastener, consistent with at least one example of the present disclosure.
Figure 12:
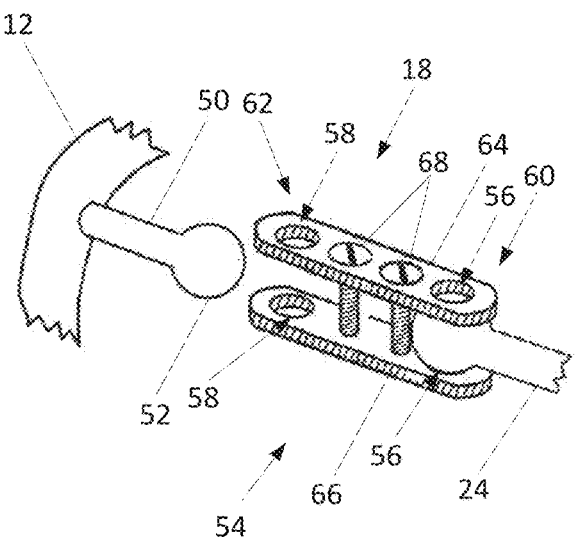
FIG. 12 generally illustrates one example of the joint of FIG. 10 having a biasing fastener, consistent with at least one example of the present disclosure.

With reference to FIG. 9, a further example of a joint 18 consistent with at least one aspect of the present disclosure is generally illustrated. The joint 18 may include a first post 24 and a second post 50. The first post 24 may extend from the side arm 16 and include an enlarged head 30 as generally described herein. The second post 50 may extend from the frame 12 and include an enlarged head 52. The joint 18 may further include one or more interconnects 54. The interconnect 54 may include a first socket 56 configured to receive the first enlarged head 30 and a second socket 58 configured to receive the second enlarged head 52. The first and second sockets 56, 58 may be disposed at generally opposite end regions 60, 62 of the interconnect 54. One example of the interconnect 54 may include two oppositely disposed plates 64, 66. One or more of the sockets 56, 58 may be formed by a recessed region in the form of a cavity extending partially into one or more of the plates 64, 66 as shown in FIG. 9 and/or one or more of the sockets 56, 58 may be at least partially formed by an aperture extending completely through a plate 64, 66 as shown in FIG. 10. Optionally, the joint 18 may include one or more biasing fasteners 68 (e.g., a bolt or the like) as generally illustrated in FIGS. 9-12. By threading one or more of the biasing fasteners 68, the compressive force generated by the interconnect 54 (e.g., the sockets 56, 58 formed by the plates 64, 66) against the enlarged heads 30, 52 may be adjusted.

Figure 13:
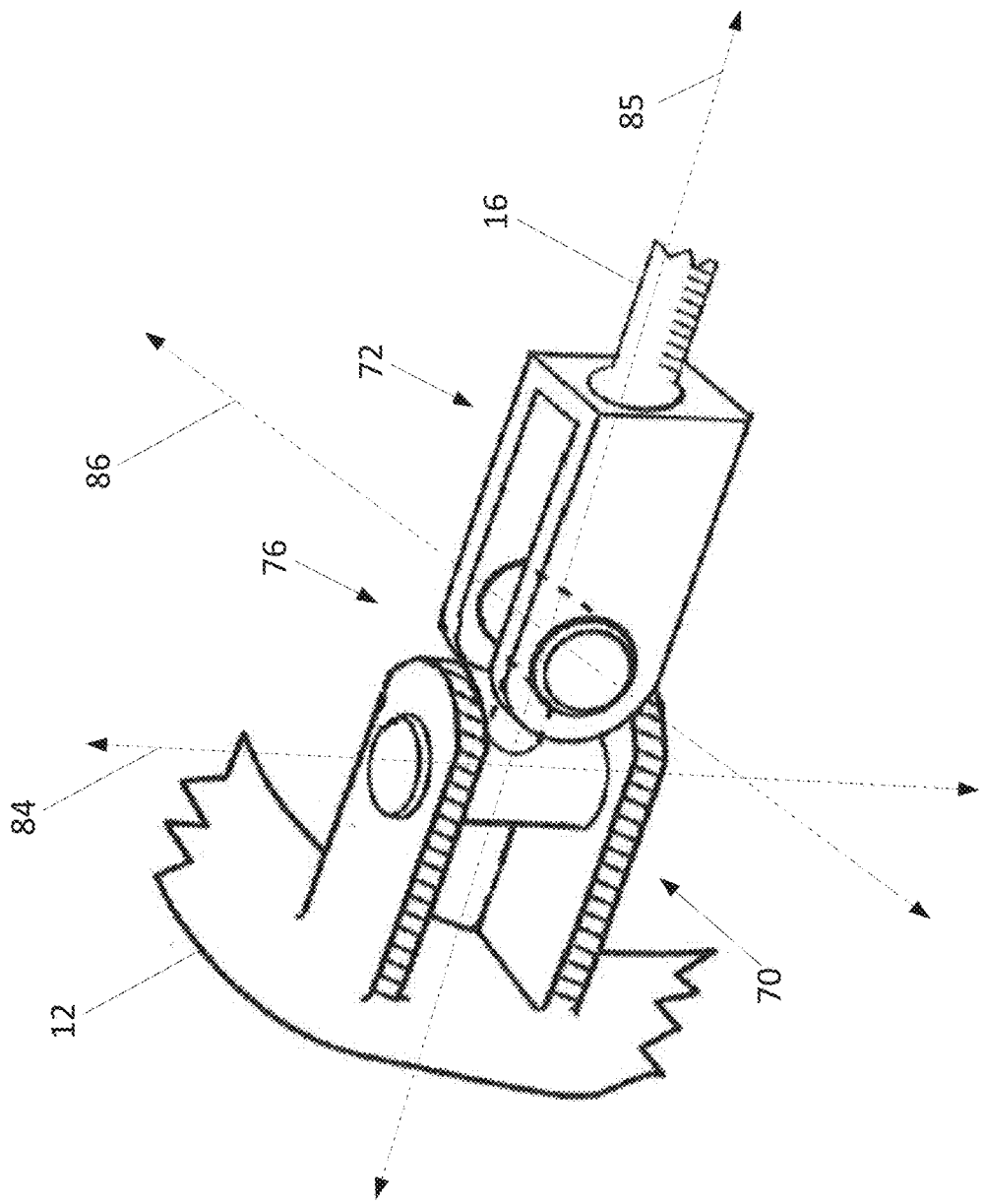
FIG. 13 generally illustrates yet another example of a joint, consistent with at least one example of the present disclosure.
Figure 14:
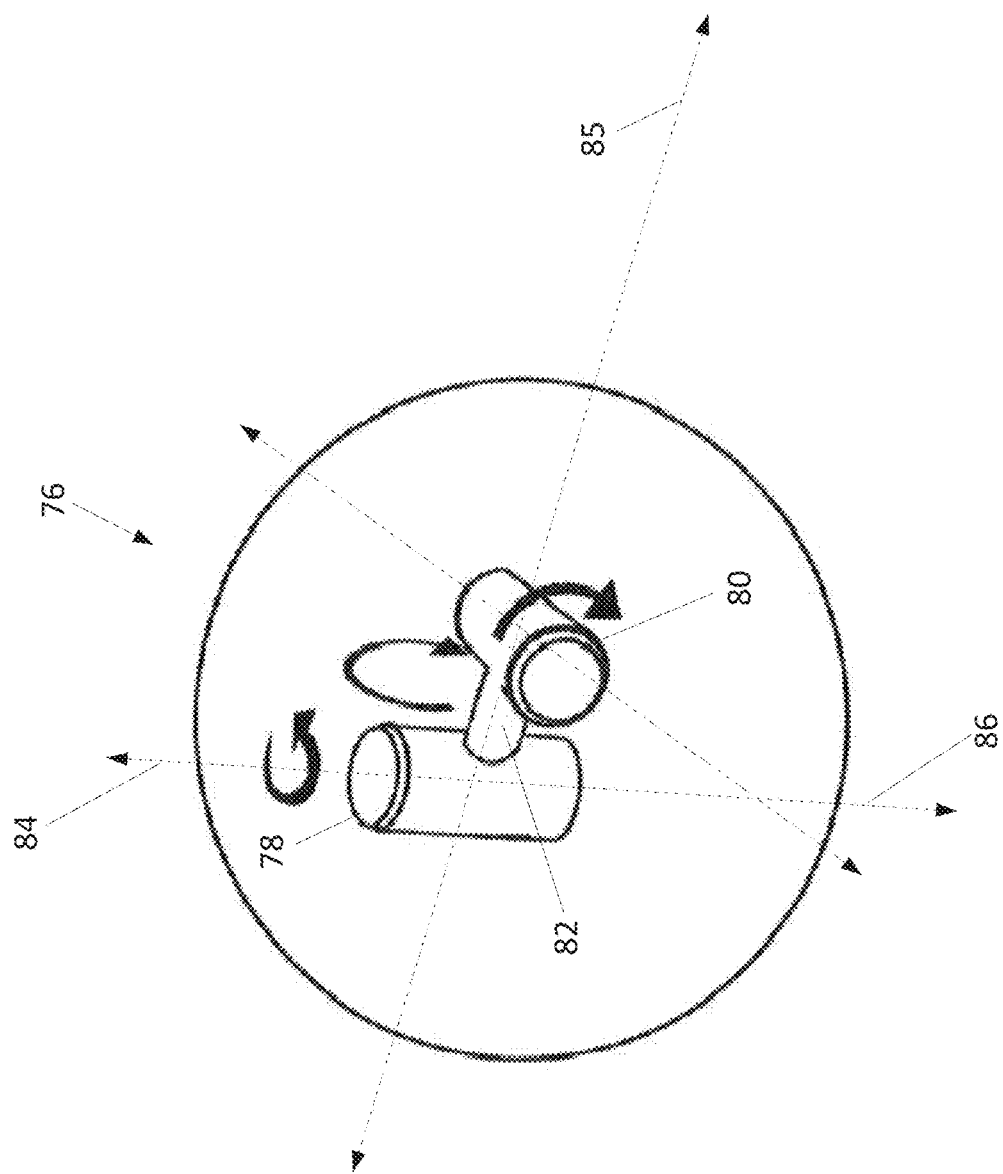
FIG. 14 is a close-up of one example of a U-joint of FIG. 13, consistent with at least one example of the present disclosure.
Figure 15:
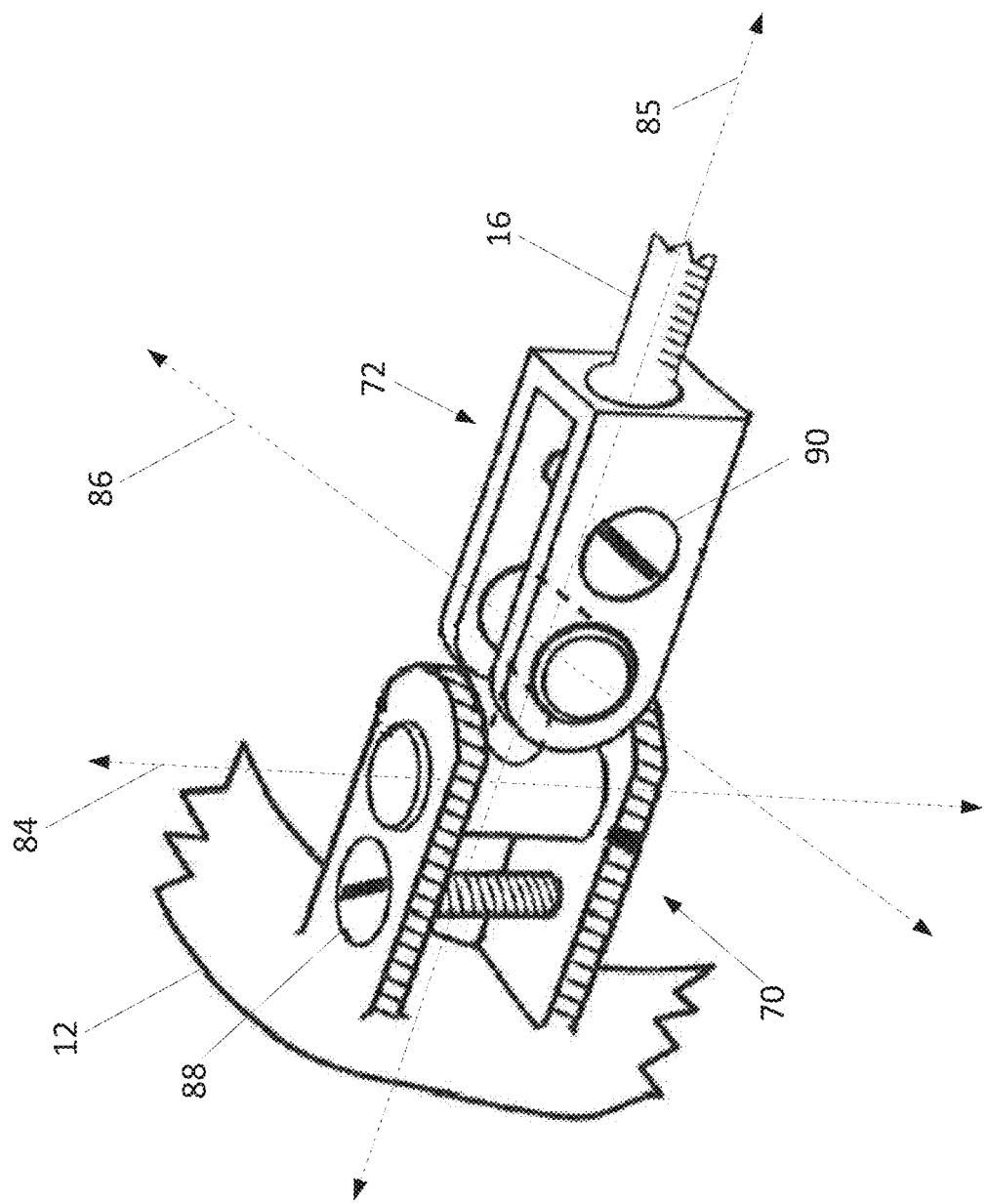
FIG. 15 generally illustrates one example of the U-joint of FIG. 13 having a biasing fastener, consistent with at least one example of the present disclosure.

Turning now to FIG. 13, another example of a joint 18 consistent with at least one aspect of the present disclosure is generally illustrated. The joint 18 may include a first flange 70 extending from the frame 12 and a second flange 72 extending from the side arm 16. One or more of the flanges 70, 72 may extend directly from the frame 12 and/or side arm 16 and/or from an intermediate member (such as, but not limited to a prong, post, or the like). The flanges 70, 72 may each be pivotally coupled to a universal joint (U-joint) 76. A close-up of one example of a U-joint 76 is generally illustrated in FIG. 14. The U-joint 76 may comprise a pair of hinges 78, 80 oriented at 90° to each other and connected by a cross shaft 82. The first hinge 78 is configured to allow the first flange 70 to pivot about a first axis 84 and the second hinge 72 to pivot about a second axis 86 which is perpendicular to the first axis 84. The joint 18 may also optionally be configured to pivot about a third axis 85. In particular, the cross shaft 82 may include a pivot which rotates about the third axis 85 relative to the hinges 78, 80. Of course, it should be appreciated that the U-joint 76 of FIG. 14 is merely one example, and that the present disclosure is not limited to this example unless specifically claimed as such. Optionally, one or more of the flanges 70, 72 may include a biasing fastener 88, 90 (e.g., a bolt or the like) as generally illustrated in FIG. 15. By threading one or more of the biasing fasteners 88, 90, the compressive force generated by the flanges 70, 72 against the first and/or second hinges 78, 80 may be adjusted.

Figure 16:
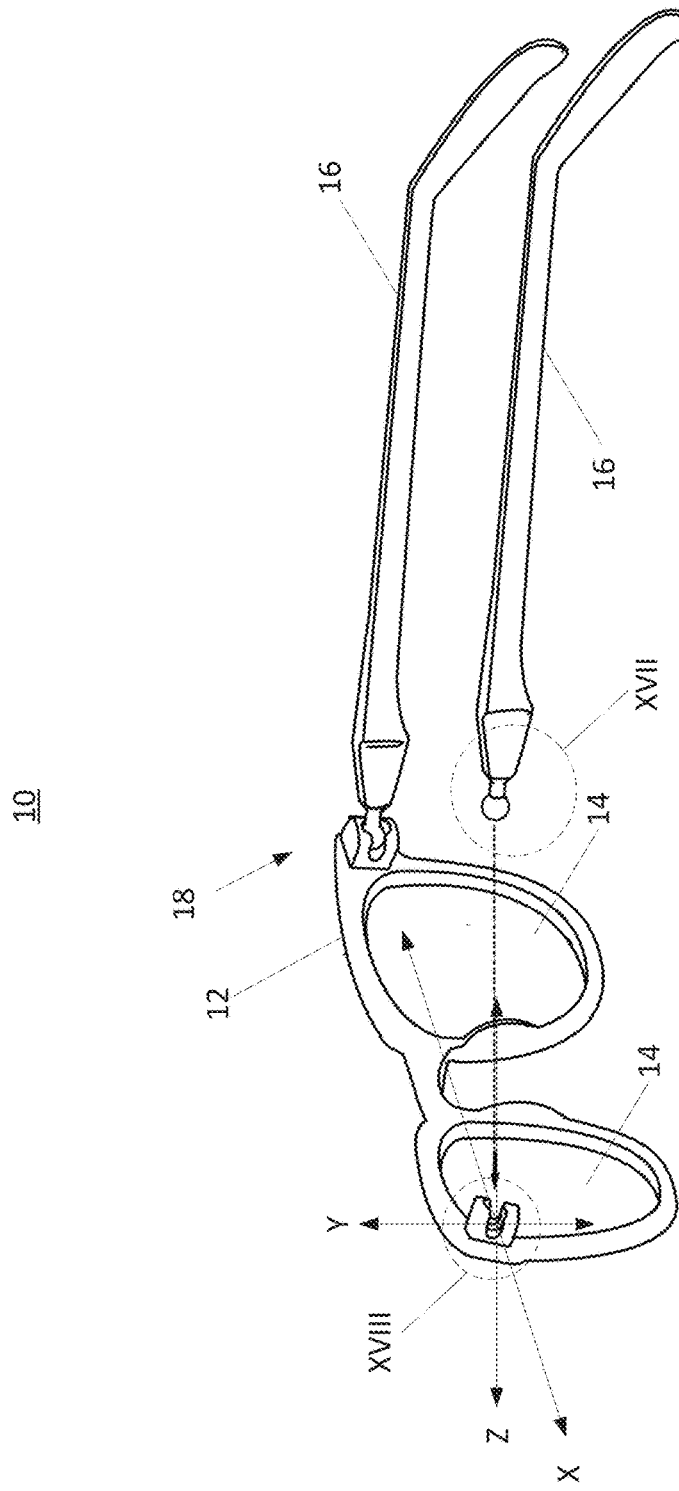
FIG. 16 generally illustrates a pair of glasses including another aspect of a joint, consistent with at least one example of the present disclosure.
Figure 17:
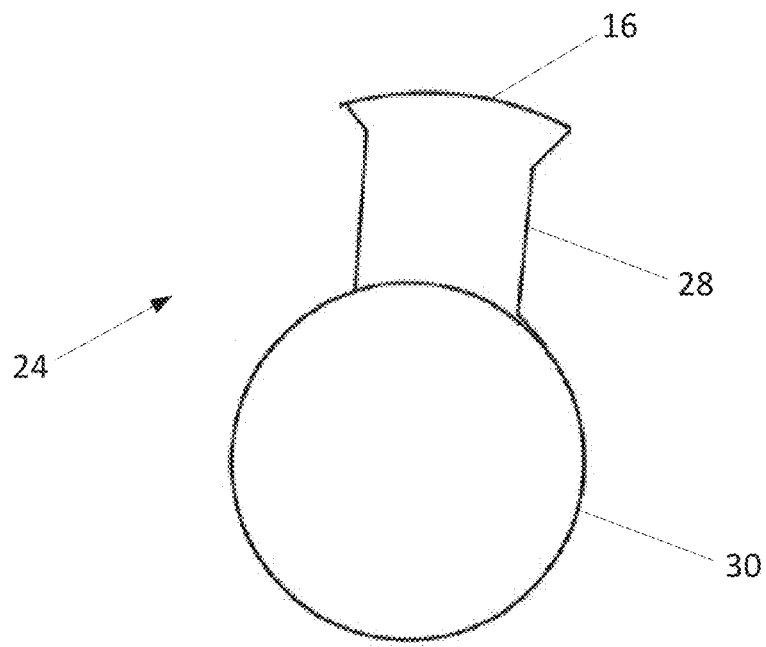
FIG. 17 corresponds to region XVII in FIG. 16, consistent with the present disclosure.
Figure 18:
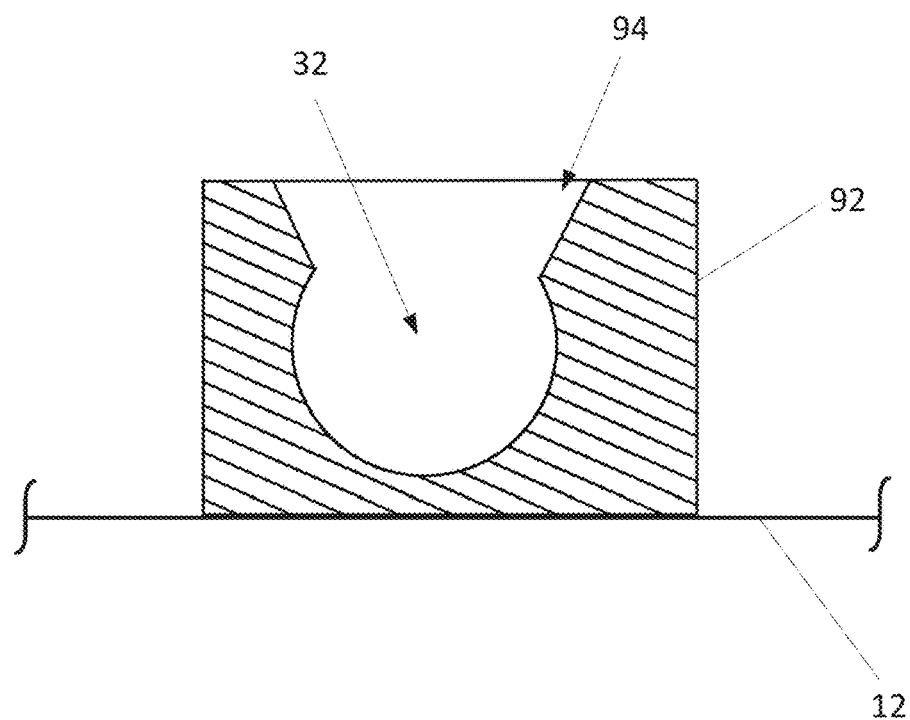
FIG. 18 corresponds to a cross-sectional view of region XVIII in FIG. 16, consistent with at least one example of the present disclosure.

Another example of glasses 10 including a joint 18 consistent with at least one aspect of the present disclosure is generally illustrated in FIG. 16. The joint 18 may be configured to allow a side arm 16 to articulate in three axes (e.g., the X-axis, the Y-axis, and the Z-axis) relative to the frame 12. Close-up views of the joint 18 are shown in FIGS. 17-18. In particular, FIG. 17 corresponds to region XVII in FIG. 16 and FIG. 18 corresponds to a cross-sectional view of region XVIII in FIG. 16.

The joint 18 may include one or more posts 24 extending from one or more side arms 16 and one or more bases 92 coupled to the frame 12. It should be appreciated that the orientation of the posts 24 and the bases 92 relative to the side arm 16 and frame 12 may be reversed. The post 24 may include a shaft 28 and an enlarged head 30. The post 24 may be permanently or removably coupled (e.g., but not limited to, threadably coupled) to the side arm 16. The enlarged head 30 may have a transverse cross-section (i.e., a cross-section which is transverse to the longitudinal axis of the shaft 28) which is larger than the transverse cross-section of the shaft 28. For example, the enlarged head 30 may have a diameter that is larger than a diameter of the shaft 28, though it should be appreciated that the shaft 28 and the enlarged head 30 are not limited circular transverse cross-sections unless specifically claimed as such. The enlarged head 30 may be disposed at a distal most end of the shaft 28.

Figure 21:
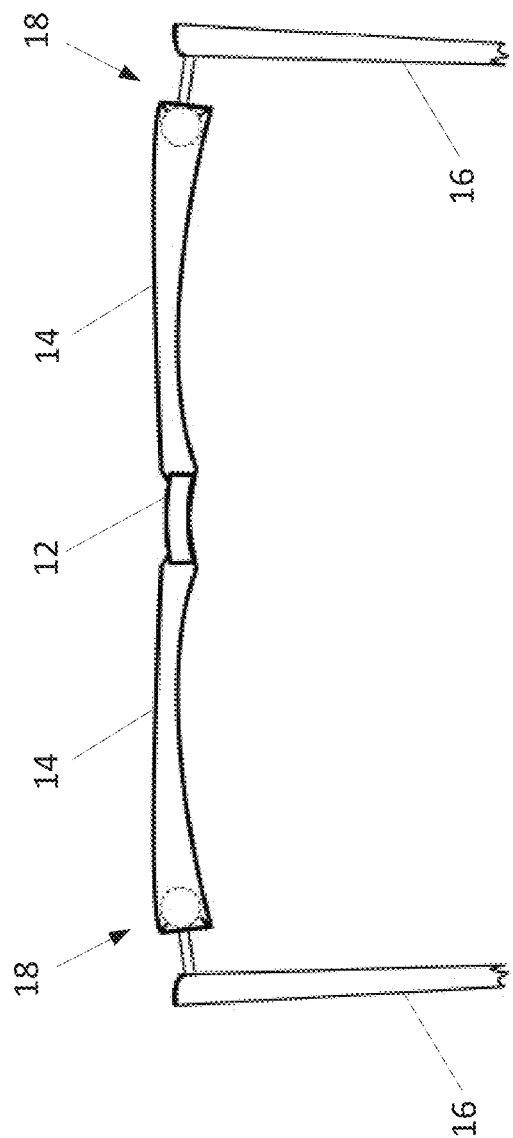
FIG. 21 generally illustrates another aspect of the base of FIGS. 16-20, consistent with at least one example of the present disclosure.
Figure 22:
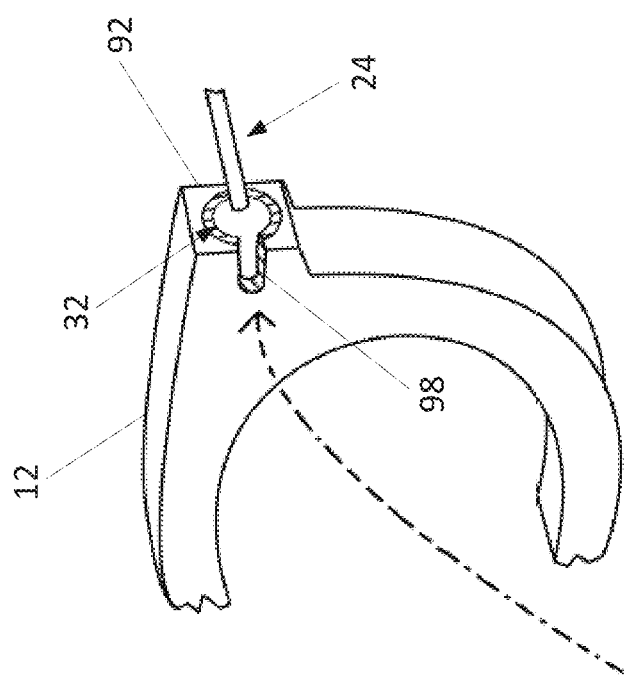
FIG. 22 is another aspect of the joints of FIGS. 16-20, consistent with at least one example of the present disclosure.

The base 92 may define at least one socket 32 configured to receive at least a portion of the post, e.g., at least a portion the enlarged head as generally illustrated. The base 92 may extend from the frame 12 as generally illustrated; however, it should be appreciated that the base 92 may be substantially flush with the surrounding frame 12, and the socket 32 may be recessed into the frame 12, e.g., as generally illustrated in FIG. 21. The socket 32 may be sized and shaped to receive and retain the enlarged head 30 of the post 24 therein. In particular, the socket 32 may have a cross-sectional dimension configured to apply a compressive force against the enlarged head 30 of the post 24. As such, the socket 32 may have a cross-sectional dimension substantially corresponding to and/or slightly smaller than the cross-sectional dimension (e.g., diameter) of the enlarged head 30. As used herein, the term "slightly smaller" is intended to mean that the cross-sectional dimension is up to 20% smaller than the cross-sectional dimension (e.g., diameter) of the enlarged head 30, for example, up to 10% smaller than the cross-sectional dimension (e.g., diameter) of the enlarged head 30, up to 5% smaller than the cross-sectional dimension (e.g., diameter) of the enlarged head 30, and/or up to 3% smaller than the cross-sectional dimension (e.g., diameter) of the enlarged head 30, including all values and ranges therein.

Figure 20:
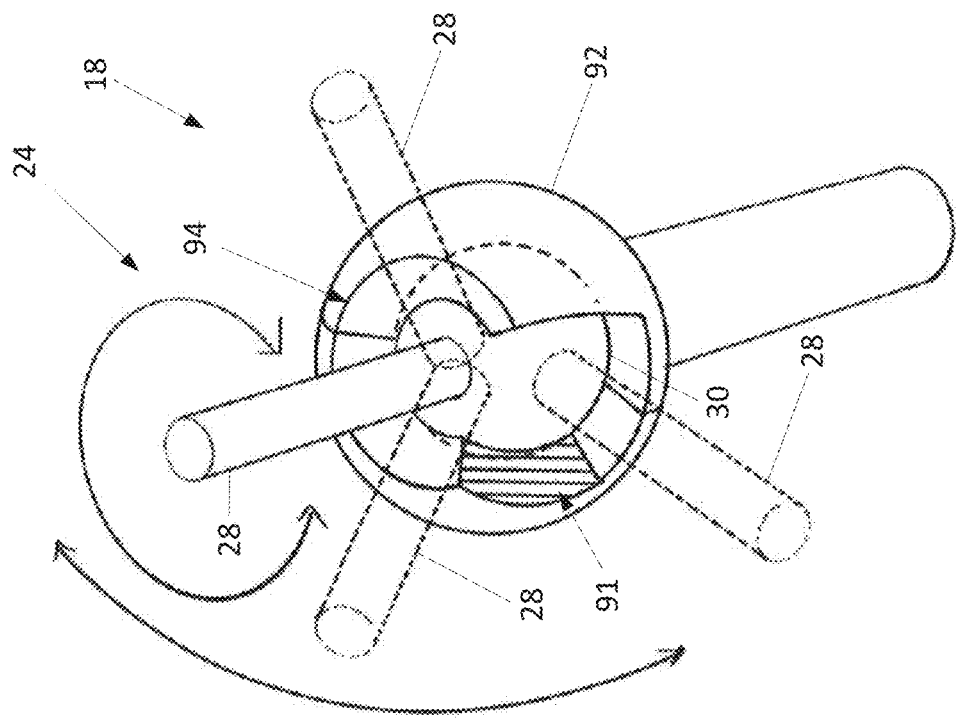
FIG. 20 is another view of the joint of FIG. 19, consistent with at least one example of the present disclosure.
Figure 19:
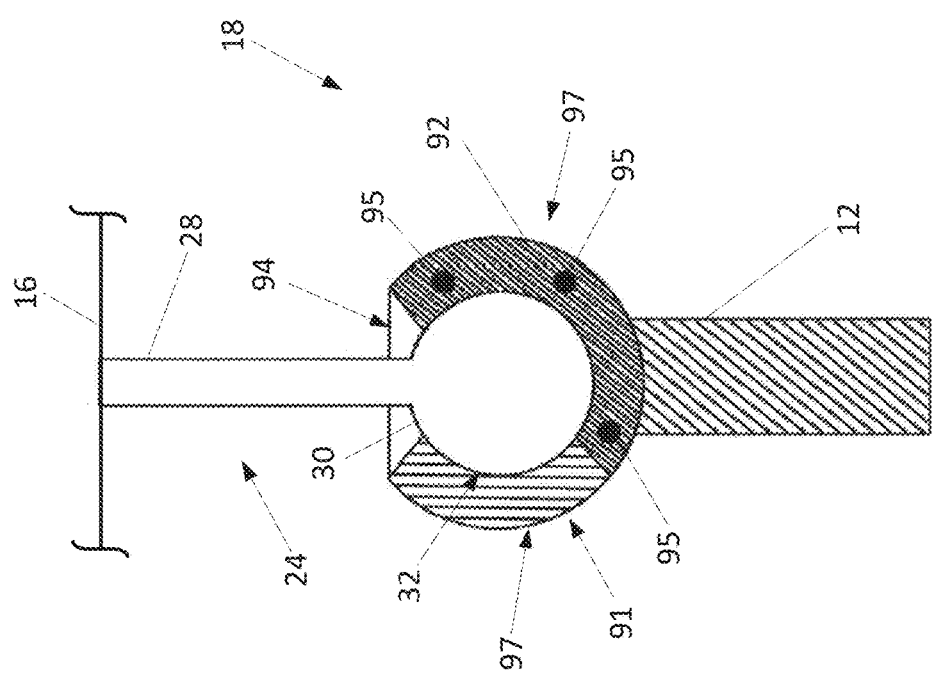
FIG. 19 is another aspect of a joint, consistent with at least one example of the present disclosure.

Turning now to FIGS. 19-20, another aspect of the joint 18 similar to those of FIGS. 16-18 is generally illustrated. The socket 32 may have an opening 94 configured to allow the shaft 28 to pass therethrough and configured to allow the shaft 28 to articulate relative to the prongs 26. For example, FIG. 19 is a cross section of FIG. 20. The enlarged head 30 (e.g., ball) may be inserted into the socket 32 while the socket 32 is disassembled. One or more fasteners 95 (e.g., screws) may be provided to hold the two or more portions 97 of the socket 32 together around the enlarged head 30. One or more of the portions 97 may define one or more slots 91 in which the shaft 28 can articulate into, allowing the sidearms 16 to close against the frame 12.

Alternatively, the base 92 forming the socket 32 may be formed from a resiliently deformable material as described herein such that the base 92 can deform outwardly as the enlarged head 30 is advanced into the socket 32, and then resiliently return to at least 15% of its original size/shape once the enlarged head 30 is received in the socket 32, thus allowing the socket 32 to apply a compressive force against the enlarged head 30. The opening 94 may be sized and shaped to allow the post 24 to articulate in the X, Y, and Z axes. For example, the opening 94 may have a generally figure "8" and/or hourglass shape as illustrated in FIG. 20. Alternatively, the opening may be in the form of a circular and/or an elongated slit (e.g., an oval).

Optionally, a joint 18 consistent with FIGS. 16-20 may include a base 92 having one or more slots, grooves, or the like 98 as generally illustrated in FIGS. 22 and 27A-H. One or more of the slots 98 may be configured to receive a portion of the arms 16 and/or posts 24 to allow the arms 16 to fold in while the socket 32 is generally flush with the frame 12. Alternatively (or in addition), one or more of the slots 98 may be provided to allow the arms 16 to move to one or more other predetermined positions relative to the frame 12 (e.g., but not limited to, extending forward relative to the frame 12, generally in-line/parallel with the frame 12, generally upwards relative to the frame 12, generally downwards relative to the frame 12, or the like). The slots 98 may be arranged in various configurations. For example, two slots 98 may be arranged linearly on opposite sides of the base 92, three slots 98 may be arranged in a T formation, three slots 98 may be arranged evenly circumferentially (e.g., in thirds and/or a Y formation), and/or four slots 98 may be arranged evenly circumferentially (e.g., in fourths and/or an X formation). Of course, the arrangements of the slots 98 in FIGS. 22 and 27A-H are merely exemplary configurations and the present disclosure is not limited to these specific arrangements unless specifically claimed as such.

Figure 24:
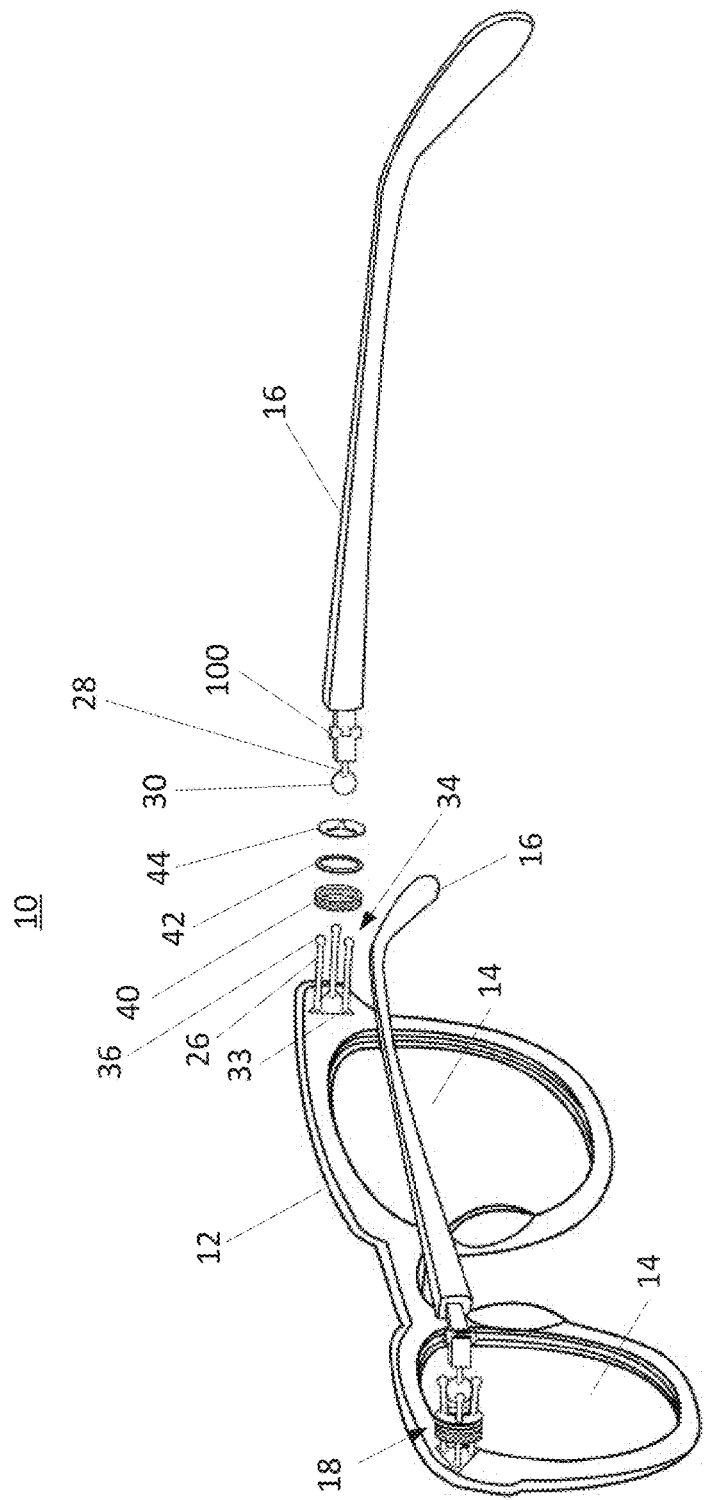
FIGS. 24-26 generally illustrate another aspect of a joint consistent with at least one example of the present disclosure in combination with a traditional hinge.
Figures 25, 26:
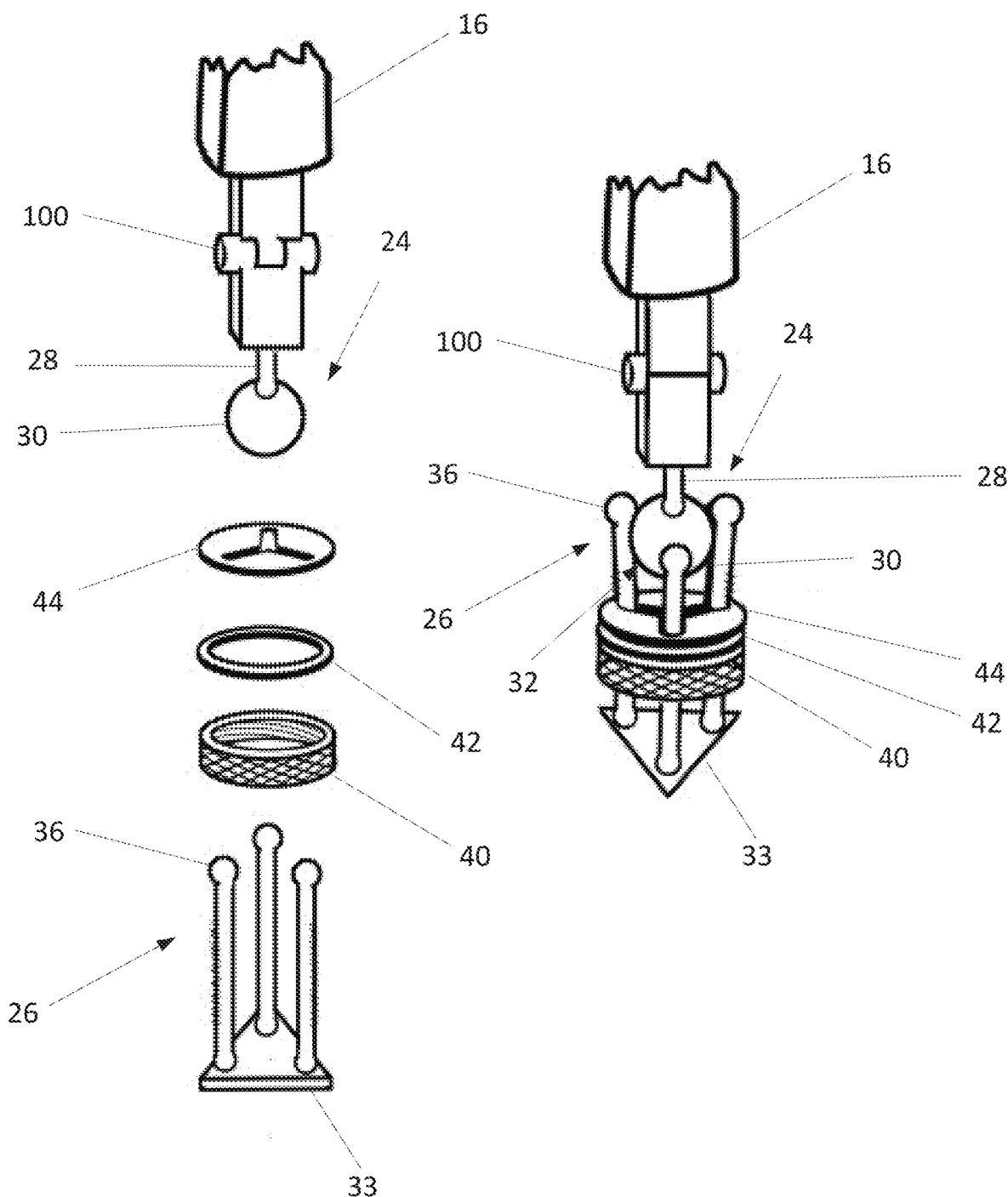
Figure 27A:
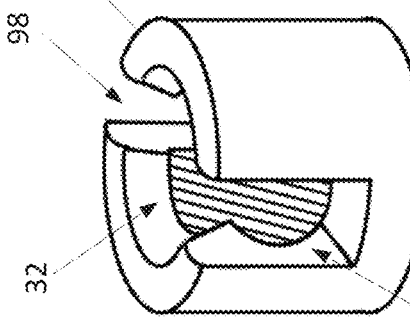
FIGS. 27A-H generally illustrate various arrangements of slots in a base, consistent with at least one example of the present disclosure.
Figure 27B:
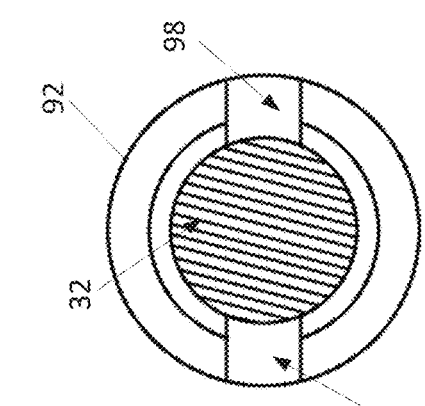
Figure 27C:
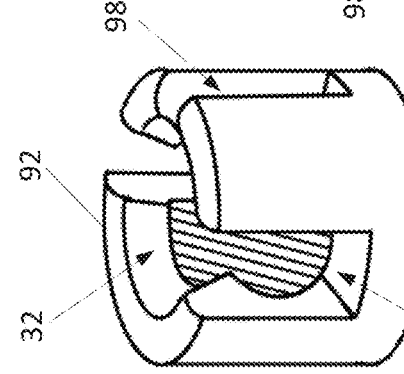
Figure 27D:
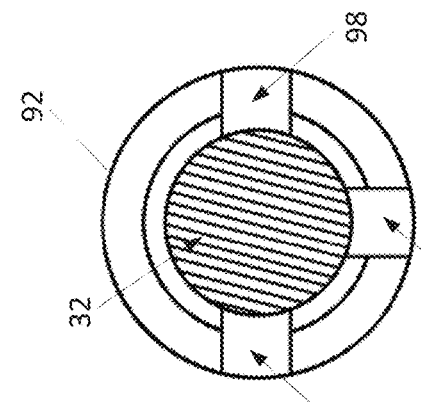
Figure 27E:
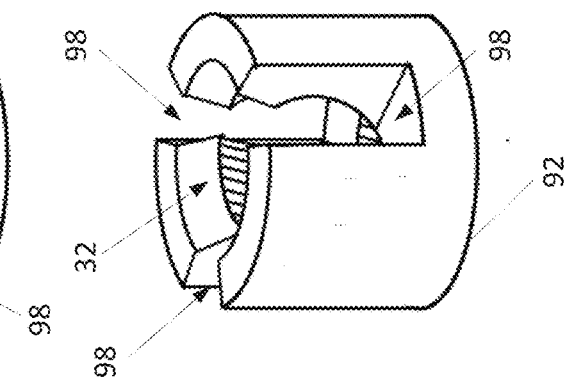
Figure 27F:
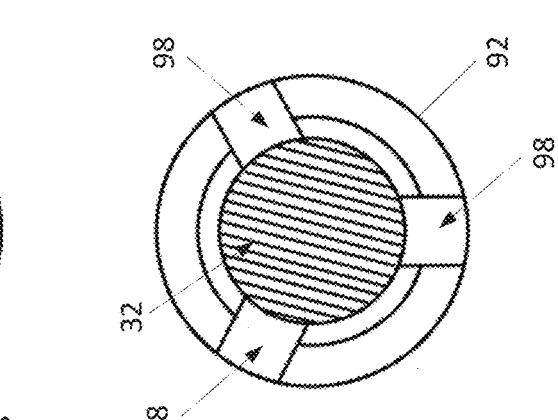
Figure 27G:
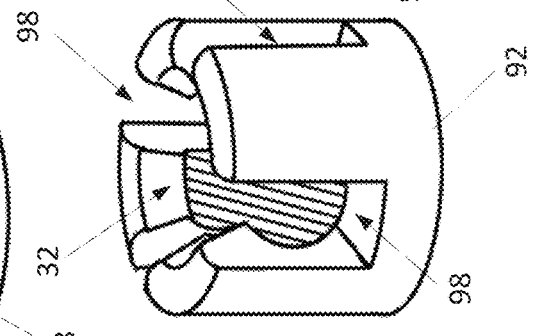
Figure 27H:
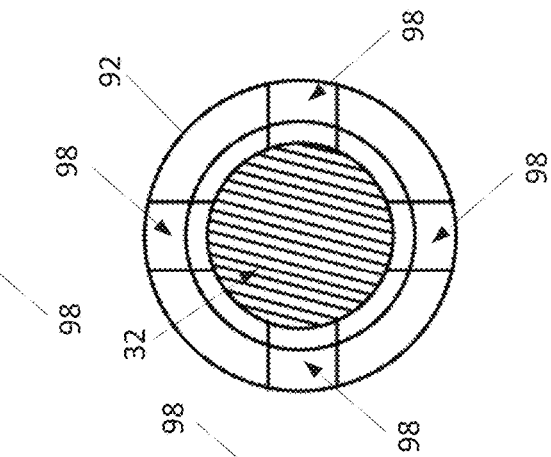

Turning now to FIGS. 24-26, any of the joints 18 disclosed herein may be combined with a traditional hinge 100. The traditional hinge 100 may include any hinge known to those skilled in the art, and may be configured to allow the side arms 16 to fold after the joint 18 is fully locked. This may allow the glasses 10 to be easily returned to a previous configuration/orientation after the glasses 10 have been collapsed. In particular, the force exerted by the joint 18 (e.g., the compressive force exerted by the prongs 26 on the enlarged head 30 of the post 24) may be sufficiently large to generally retain the alignment of the post 24 relative to the prongs 26. To this end, the force exerted by the joint 18 may be larger than the force necessary to collapse the traditional hinge 100. In some embodiments, the force exerted by the joint 18 may be 50% or more greater than the force necessary to collapse the traditional hinge 100. As such, the joint 18 may retain its previous alignment after the traditional hinge 100 has been collapsed. Subsequently, the user may open the traditional hinge 100, and the arms 16 may be aligned at the previously set orientation relative to the frame 12 using the joint 18.

Figure 28:
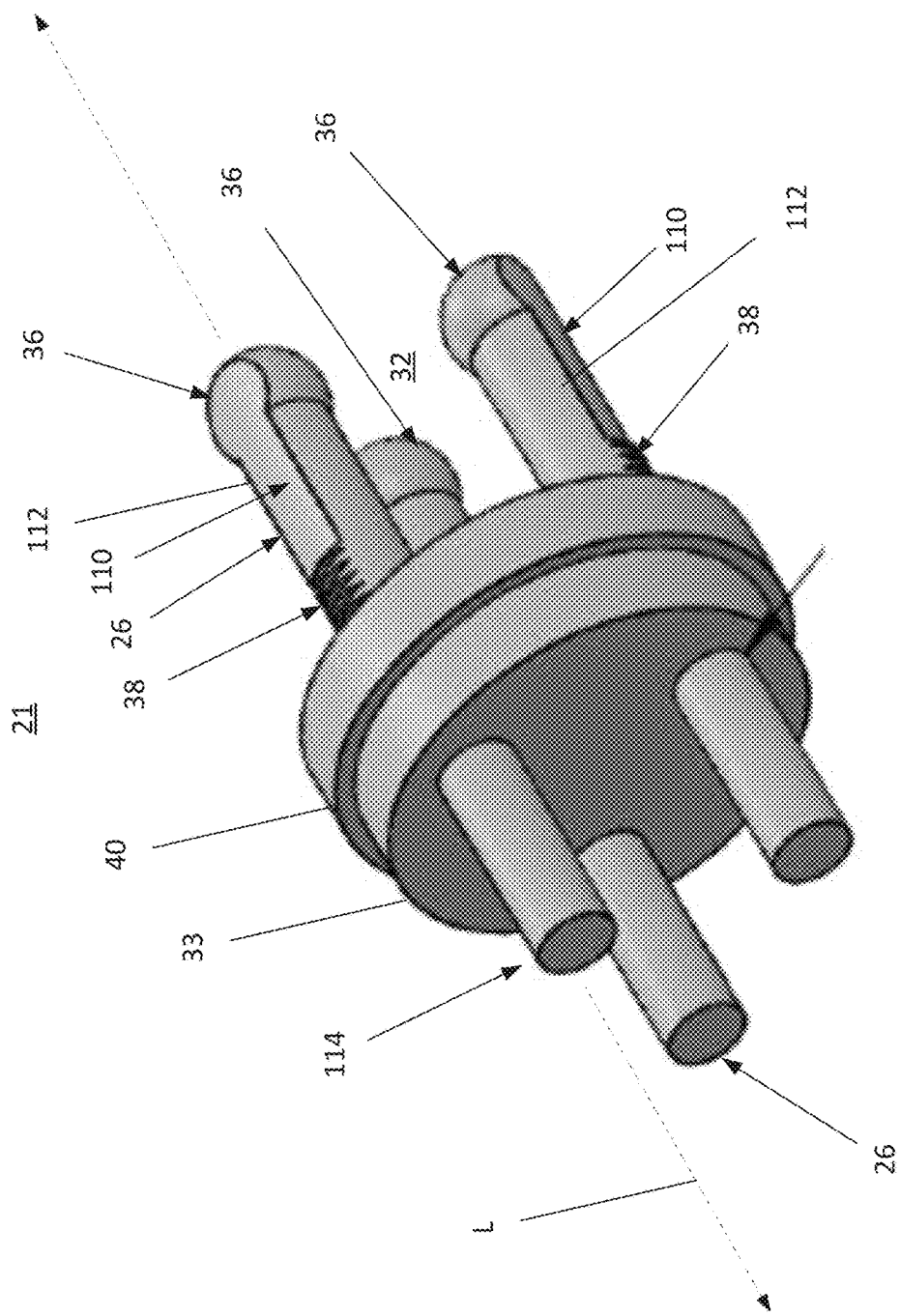
FIG. 28 generally illustrates a rear perspective view of another aspect of a prong assembly, consistent with at least one example of the present disclosure.
Figure 29:
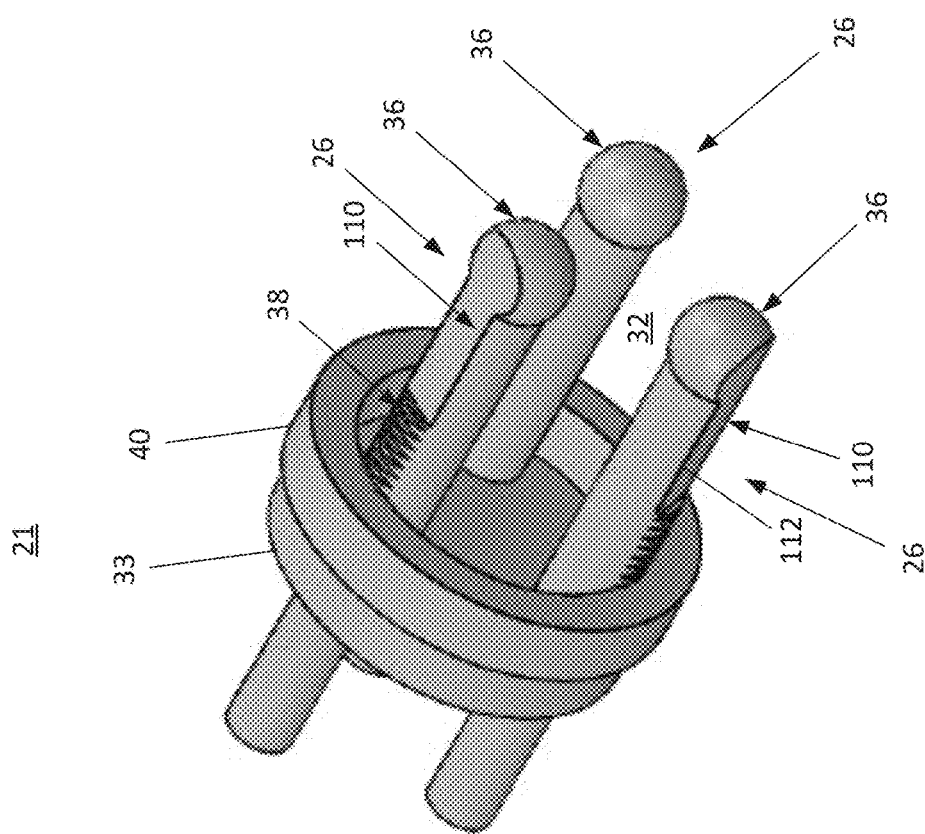
FIG. 29 generally illustrates a front perspective view of the prong assembly of FIG. 28.
Figure 30:
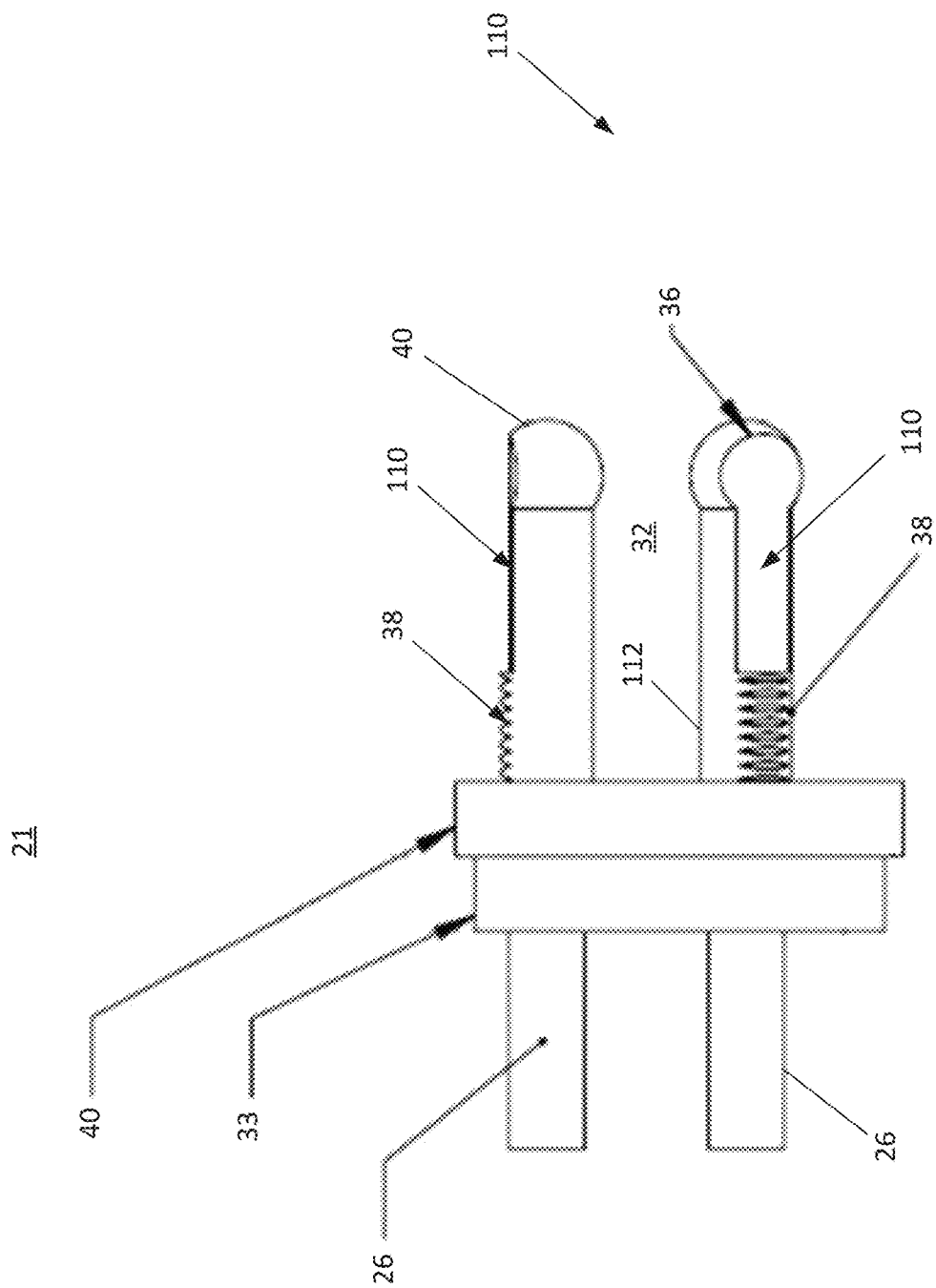
FIG. 30 generally illustrates a side view of the prong assembly of FIG. 28.

Turning now to FIGS. 28-31, another example of a joint 18 consistent with at least FIGS. 2-4 of the present disclosure is generally illustrated. In particular, FIG. 28 is a rear perspective view of the prong assembly 21, FIG. 29 is a front perspective view of the prong assembly 21 of FIG. 28, FIG. 30 is a side view of the prong assembly 21 of FIG. 28, and FIG. 31A-31B are front views of the prong assembly 21 showing the socket 32 configured to receive at least a portion (e.g., the enlarged head 30) of the post 24.

The joint 18 of FIGS. 28-31 may be similar to the joint 18 of FIGS. 2-4 without the collars 42 and washers 44. Similar to the joint 18 of FIGS. 2-4, the joint 18 of FIGS. 28-31 may include one or more prongs 26 having an outer region 110 with a planar or substantially planar surface. The planar outer region 110 may facilitate advancement of the nut 40 over the prongs 26, and specifically, facilitate advancing the nut 40 into engagement with the threaded region 38 of the prongs. The planar outer region 110 may extend from the enlarged head 36 along a portion of the shaft 112 of the prong 26 up to the threaded region 38. In at least one example, the planar outer region 110 may extend along (e.g. generally parallel to) a longitudinal axis L (FIG. 28) of the prong 26 (e.g., generally parallel to the shaft 112). The planar outer region 110 may be disposed on a surface of the prong 26 which is generally opposite to the socket 32.

As noted herein, the base 33 may be secured to the frame 12 or side arm 16 in any manner known to those skilled in the art. For example, the base 33 may be secured to the frame 12 or side arm 16 using a press fit and/or an adhesive. Optionally, a portion of the base 33 may include a knurled surface or the like to increase the coupling. Alternatively (or in addition), one or more of the prongs 26 may be secured to the frame 12 or side arm 16 in any manner known to those skilled in the art. For example, a distal end 114 of the prongs 26 may extend beyond the base 33 and may be secured to the frame 12 or side arm 16 using a press fit and/or an adhesive. The distal end 114 may optionally include a knurls surface or the like to increase the coupling.

Figure 31B:
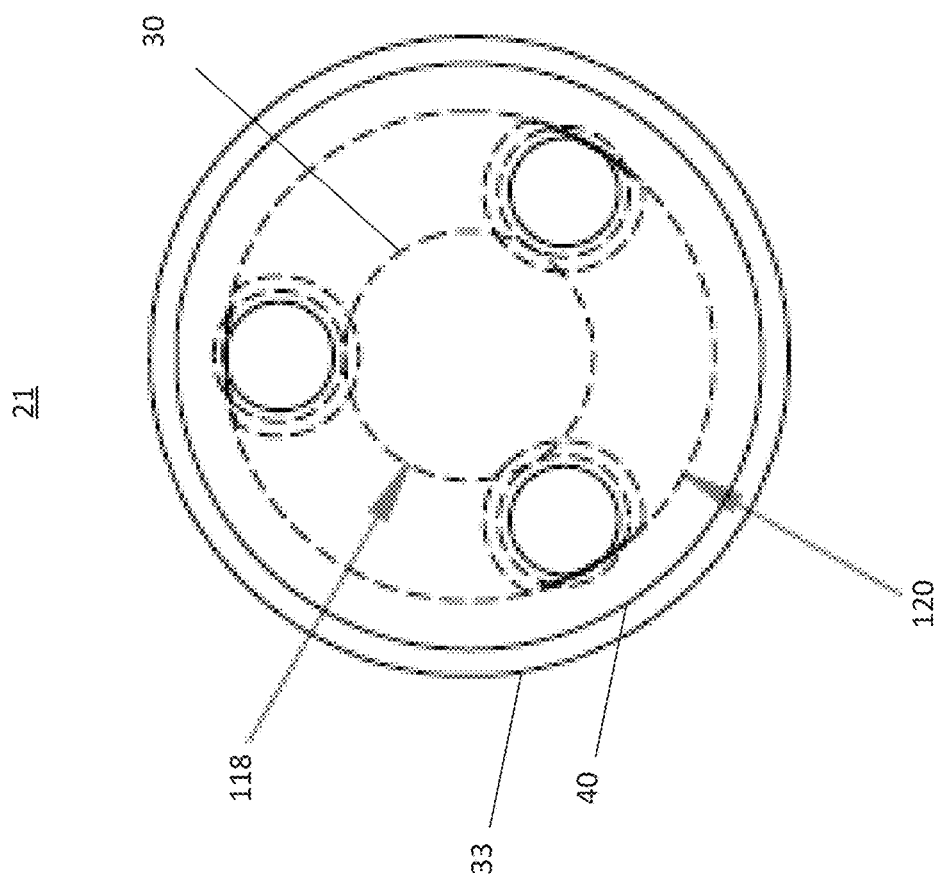

With reference to FIG. 31A, the distal diameter 116 of the socket 32 formed by the prongs 26 is generally illustrated. With further reference to FIG. 31B, the diameter 118 of the enlarged head 30 of the post 24 is generally illustrated. As can be seen, the distal diameter 116 of the socket 32 is smaller than the diameter 118 of the enlarged head 30 of the post 24 such that the enlarged head 30 of the post 24 is entrapped within the socket 32. As noted herein, the compressive force of the prongs 26 is configured to generally retain the position of the side arm 16 relative to the frame 12. For example, the compressive force of the prongs 26 is sufficient to at least overcome the weight of the side arm 16 such that the position of the side arm 16 remains generally fixed relative to the frame 12. In addition, it can be seen that the planar surface 110 may be configured such that the internal diameter 120 of the nut 40 can be advanced over/along the prongs 26.

Figure 32:
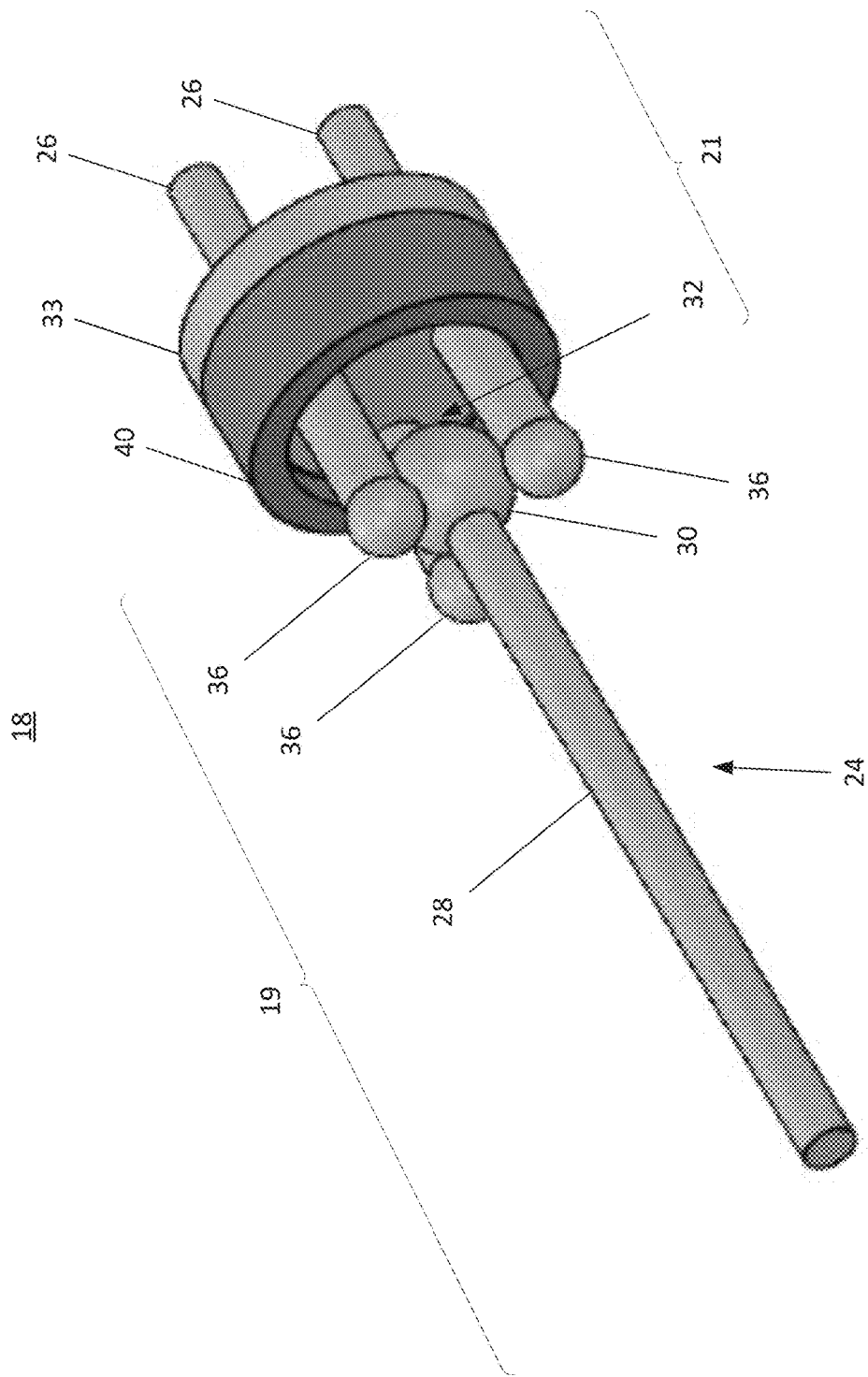
FIG. 32 generally illustrates a rear perspective view of a further aspect of a joint, consistent with at least one example of the present disclosure.
Figure 33:
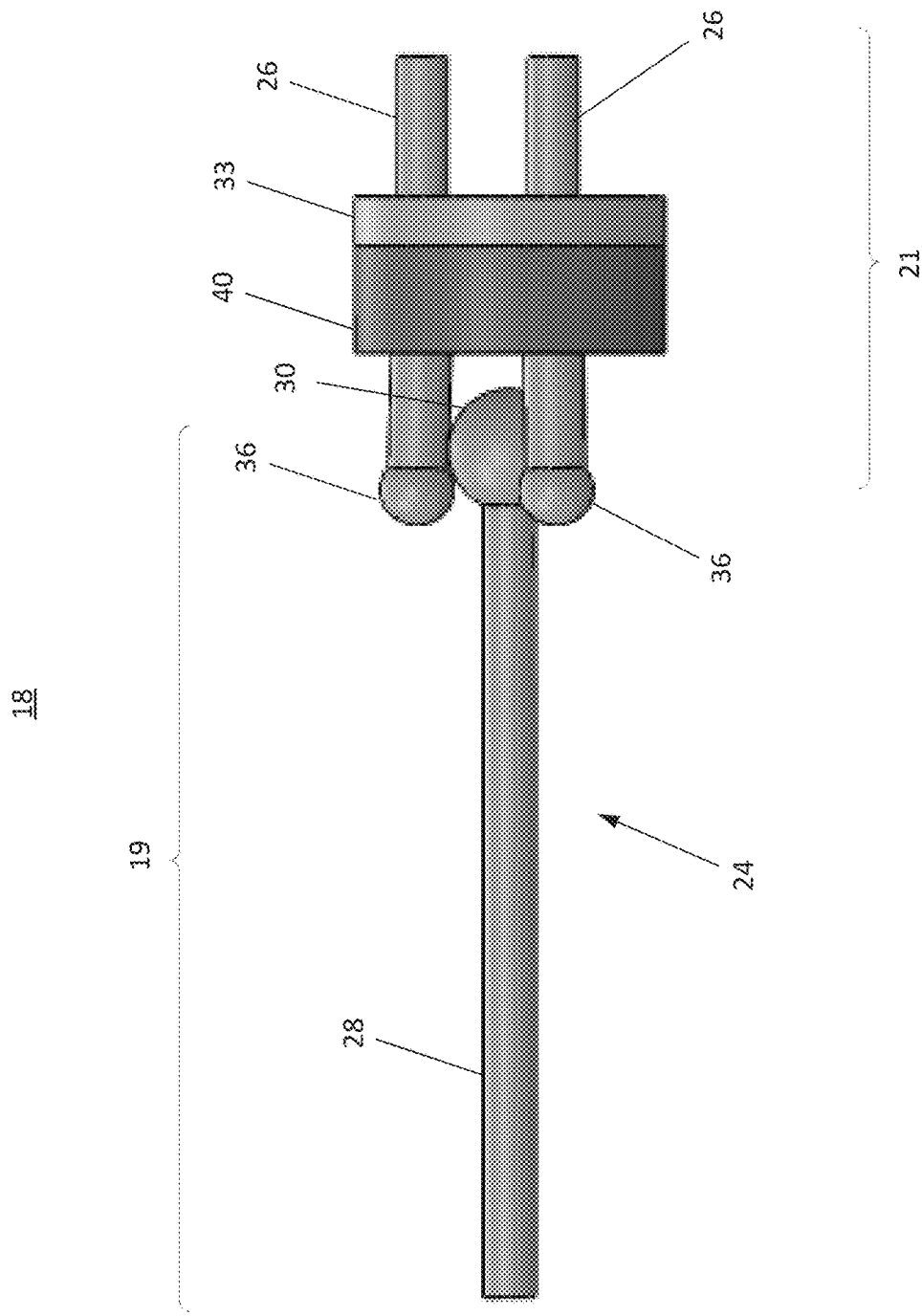
FIG. 33 generally illustrates a side view of the joint of FIG. 32.
Figure 34:
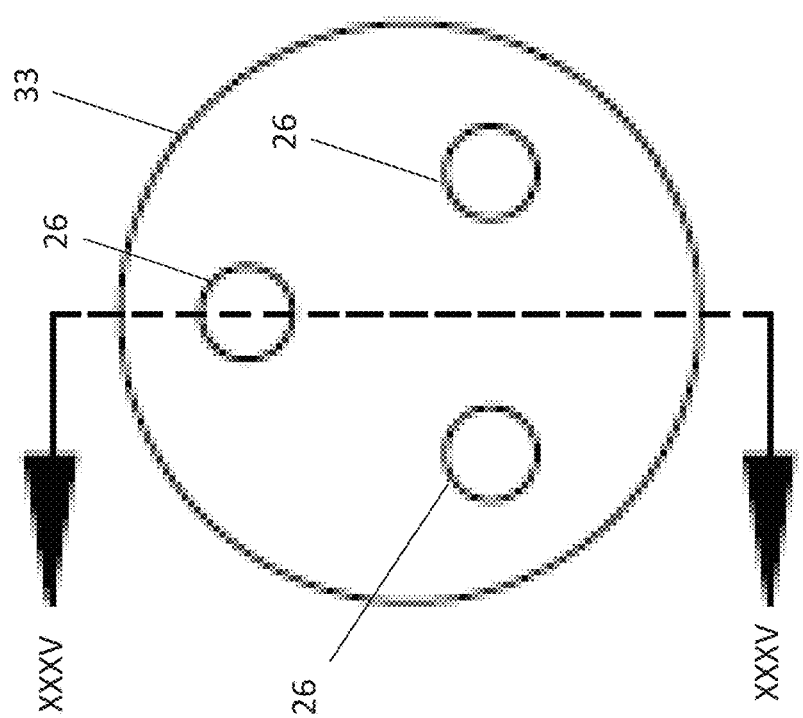
FIG. 34 generally illustrates a rear end view of the joint of FIG. 32.
Figure 35:
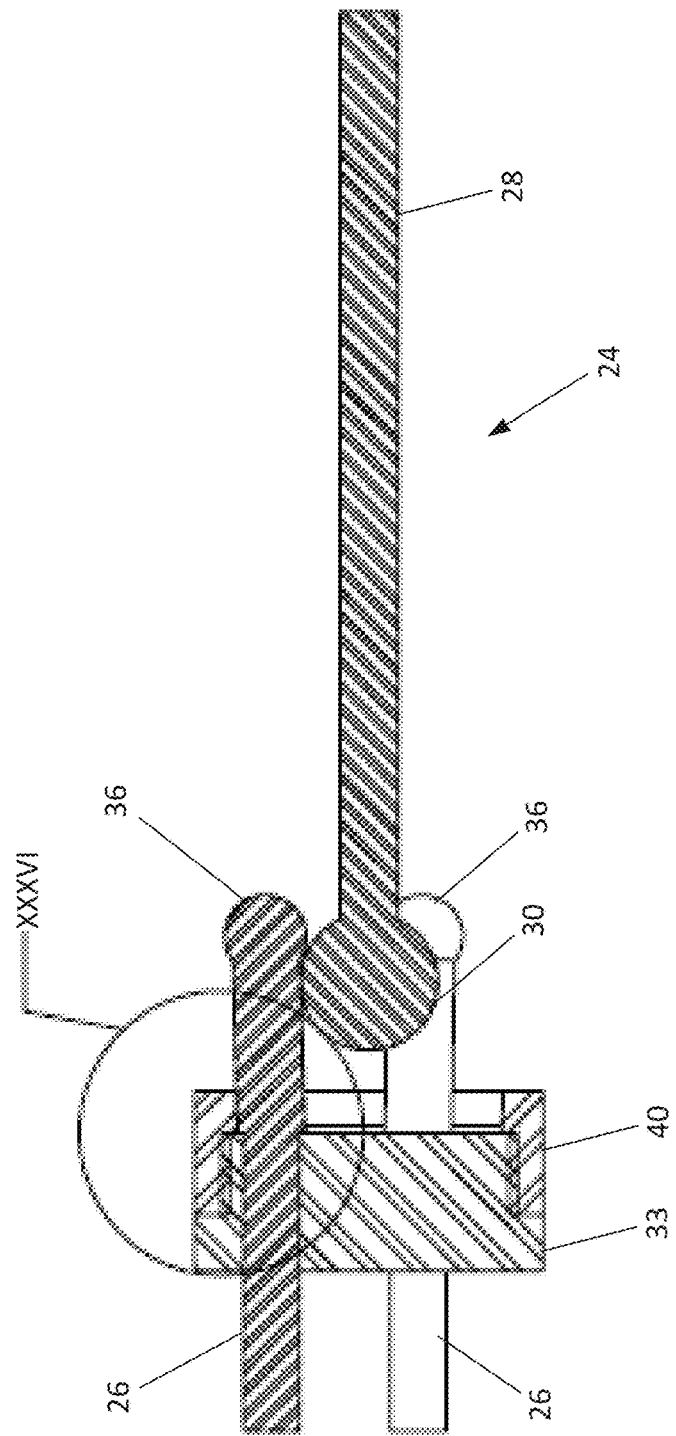
FIG. 35 generally illustrates a sectional view taken along lines XXXV-XXXV of FIG. 34.
Figure 36:
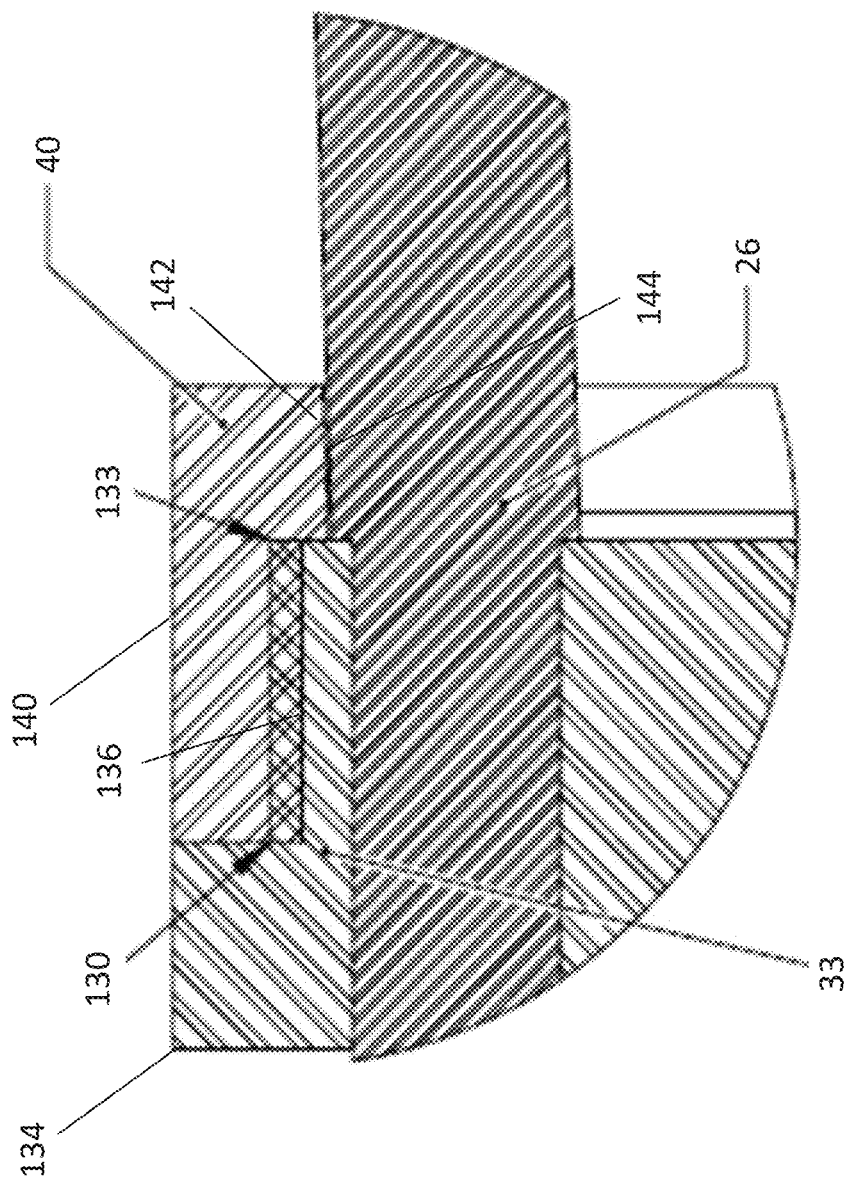
FIG. 36 generally illustrates an enlarged view of region XXXVI of FIG. 35.
Figure 37:
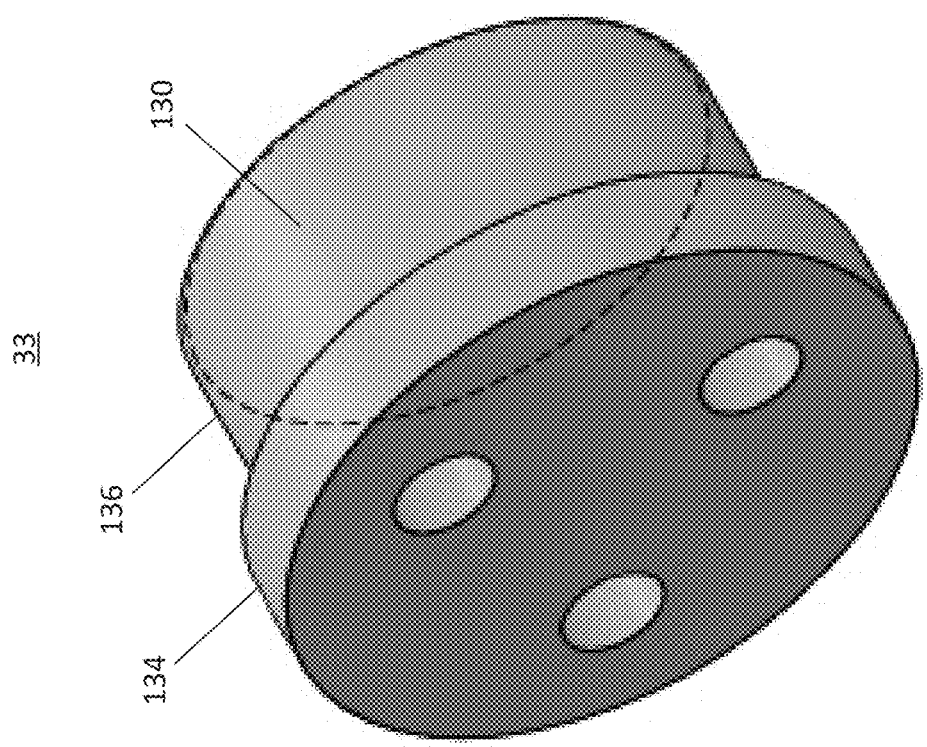
FIG. 37 generally illustrates a perspective end view of the base of FIG. 32.
Figure 38:
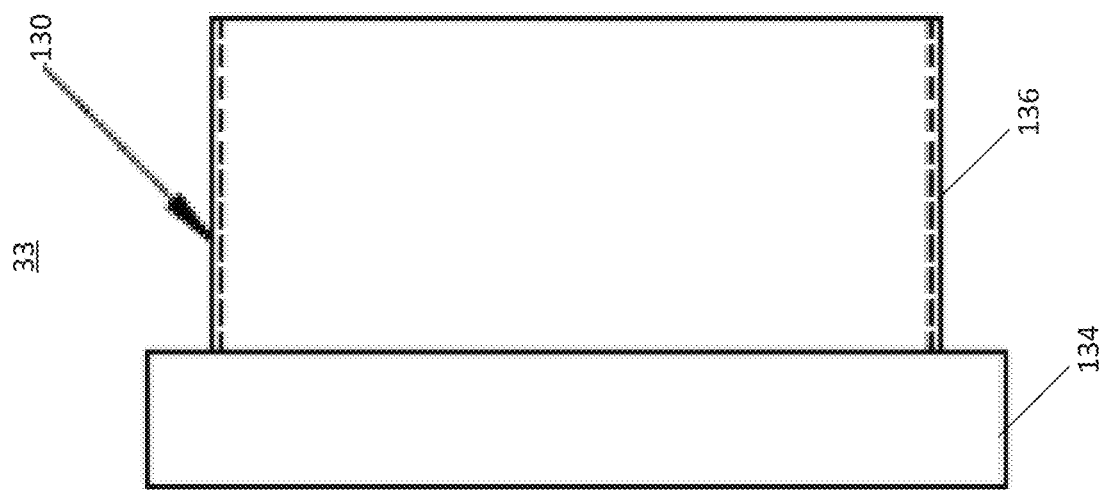
FIG. 38 generally illustrates a side view of the base of FIG. 32.
Figure 39:
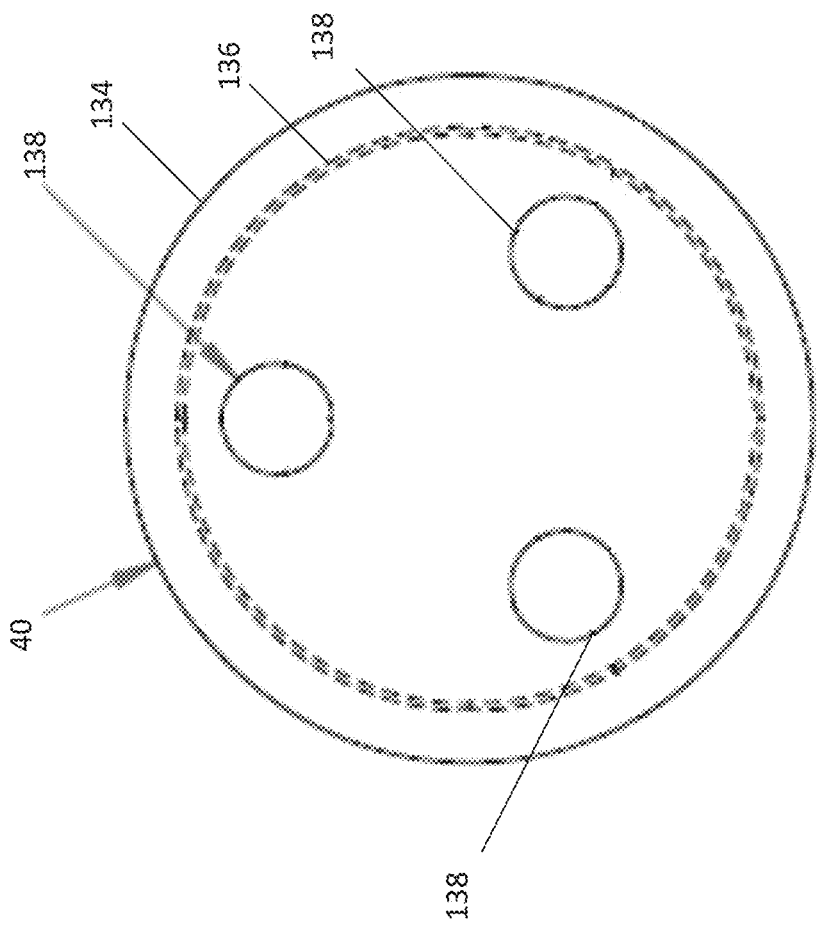
FIG. 39 generally illustrates a front-end view of the base of FIG. 32.

Turning now to FIGS. 32-39, another example of a joint 18 consistent with the present disclosure is generally illustrated. In particular, FIG. 32 is a rear perspective view of the joint 18, FIG. 33 is a side view of the joint 18 of FIG. 32, FIG. 34 is a rear end view of the joint 18 of FIG. 32, FIG. 35 is a sectional view taken along lines XXXV-XXXV of FIG. 34, FIG. 36 is an enlarged view of region XXXVI of FIG. 35, FIG. 37 is a perspective end view of the base of FIG. 32, FIG. 38 is a side view of the base of FIG. 32, and FIG. 39 is a front end view of the base 33 of FIG. 32.

The joint 18 may include at least one post 24 and a plurality of spaced apart prongs 26. The post 24 may include a shaft 28 and an enlarged head 30. The post 24 may be permanently or removably coupled (e.g., but not limited to, threadably coupled) to the side arm 16. The enlarged head 30 may have a transverse cross-section (i.e., a cross-section which is transverse to the longitudinal axis of the shaft 28) which is larger than the transverse cross-section of the shaft 28. For example, the enlarged head 30 may have a diameter that is larger than a diameter of the shaft 28, though it should be appreciated that the shaft 28 and the enlarged head 30 are not limited circular transverse cross-sections unless specifically claimed as such. The enlarged head 30 may be disposed at a distal most end of the shaft 28.

The plurality of prongs 26 may define a socket 32 configured to receive at least a portion of the post 24. In the illustrated embodiment, the plurality of prongs 26 include three prongs 26 arranged in a generally equilateral triangular configuration, though it should be appreciated that the joint 18 may include more than three prongs 26. The prongs 26 may be permanently or removably coupled (e.g., but not limited to, threadably coupled) to the frame 12. The prongs 26 may be coupled to a base 33, which in turn, may be coupled to the frame 12. An end region 34 of the prongs 26 may define the socket 32. In the illustrated example, the end region 34 may include an enlarged head 36. Similar to the enlarged head 30, enlarged head 36 may have a transverse cross-section (i.e., a cross-section which is transverse to the longitudinal axis of the prong 26) which is larger than the transverse cross-section of the prong 26. For example, the enlarged head 36 may have a diameter that is larger than a diameter of the prong 26, though it should be appreciated that the prong 26 and the enlarged head 36 are not limited circular transverse cross-sections unless specifically claimed as such. The enlarged head 36 may be disposed at a distal most end of the prong 26. The enlarged heads 36 of the plurality of prongs 26 may collectively define the socket 32 which is sized and shaped to receive and retain the enlarged head 30 of the post 24 therein. As such, the enlarged heads 36 of the plurality of prongs 26 may collectively define a socket 32 having a cross-sectional dimension substantially corresponding to the cross-sectional dimension (e.g., diameter) of the enlarged head 30 of the post 24. Optionally, the enlarged heads 36 of the plurality of prongs 26 may collectively define a socket 32 having an opening configured to allow the shaft 28 to pass therethrough and configured to allow the shaft 28 to articulate relative to the prongs 26. While the prongs 26 are shown having a plurality of enlarged heads 36 defining the socket 32, it should be appreciated that the socket 32 may be defined by one or more recesses (not shown) formed in the prongs 26 (e.g., an end region 34).

The prongs 26 may be formed from a resiliently bendable and/or resiliently deformable material. Non-limiting examples of a resiliently bendable and/or resiliently deformable material include steel (e.g., stainless steel), aluminum, titanium, alloys of steel, aluminum, and/or titanium, plastics, or the like. The prongs 26 may be configured to create a socket 32 having a cross-sectional dimension which is slightly smaller than the cross-sectional dimension (e.g., diameter) of the enlarged head 30 of the post 24. As a result, the enlarged head 30 which force the prongs 26 outwardly, thus generating a compressive force against the enlarged head 30 which may generally retain the enlarged head 30 in a desired orientation (e.g., angle) relative to the prongs 26.

With reference to FIGS. 34-39, the base 33 may include a threaded region 130 configured to threadably engage with the threaded region 133 of the nut 40. The threaded engagement between the base 33 and the nut 40 may be configured to generate the compressive force against the prongs 26 described herein. The threaded engagement between the base 33 and the nut 40 may be alternative to (or in addition to) the threaded engagement between the prongs 26 (e.g., the threaded region 38) and the nut 40.

The base 33 may include an externally threaded region 130 configured to threadably engage with an internally threaded region 133 of the nut 40, though it should be appreciated that this arrangement may be reversed. In at least one example, the base 33 may include a flange or platform 134 and a generally cylindrical projection 136 extending from the flange 134. The flange 134 may have a larger cross-section compared to the projection 136, and may be configured to be secured to the frame 12 or side arm 16 in any manner known to those skilled in the art. The flange 134 and/or the projection 136 may define one or more apertures 138 (which may extend partially and/or all the way through the base 33) configured to be coupled to the prongs 26 as described herein. At least a portion of the projection 136 may include the externally threaded region 130.

As best seen in FIGS. 35-36, the nut 40 may include a projection 140 having a generally cylindrical internally threaded region 133 configured to threadably engage with the externally threaded region 130 of the projection 136 of the base 33. The nut 40 may further include a flange 142 having a generally circular opening 144 with smaller cross-section compared to the projection 140. The smaller diameter opening 144 may be configured to apply the compressive force against the prongs 26 and the post 24 as the nut 40 is threaded towards the base 33.

One or more aspects of the glasses disclosed herein may therefore address one or more of the problems discussed herein. The joints discussed herein counterintuitively increase the flexibility of the glasses compared to known rigid glasses, which keep the configuration of the glasses in a state of unstable equilibrium that not only can be easily and nearly instantaneously adjusted by the wearer, alone, but requires being re-adjusted every time. By favoring flexibility over rigidity; frequent adjustments of the glasses are required, but are so easily achieved that the flexible (i.e., non-rigid) glasses of the present disclosure are more easily maintained in a proper state of optical and/or cosmetic alignment by the wearer without any technical assistance and/or the need for tools. This flexibility becomes a great advantage by favoring ease of adjustment over the consistency of rigidity, and eliminates the need for material-degrading, gross-applications of force and/or heating as required by the known rigid glasses.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. It will be appreciated by a person skilled in the art that glasses may embody any one or more of the features contained herein and that the features may be used in any particular combination or sub-combination. Unless defined otherwise, the term "generally" is intended to mean within 10% of the absolute value. Modifications and substitutions by one of ordinary skill in the art are considered to be within the scope of the present invention, which is not to be limited except by the claims.

What is claimed is:

1. A joint for coupling a side arm to a frame of a pair of glasses, said joint comprising:
    a post configured to be secured to one of said side arm or said frame, said post includes a shaft and an enlarged head at a distal end of said shaft;
    a plurality of prongs configured to be secured to the other of said side arm or said frame and define a socket configured to receive at least a portion of said enlarged head of said post, said plurality of prongs configured to apply a compressive force against said enlarged head of said post; and
    a nut configured to generate said compressive force applied by said plurality of prongs.

2. The joint of claim 1, wherein at least a portion of at least one of said plurality of prongs includes a threaded region configured to engage with a threaded region of said nut, wherein advancing said nut along with threaded region of said at least one prong adjusts said compressive force.

3. The joint of claim 1, wherein said plurality of prongs each include an enlarged head configured to collectively define said socket.

4. The joint of claim 1, wherein said plurality of prongs each include a recessed region configured to collectively define said socket.

5. The joint of claim 1, wherein said plurality of prongs includes three prongs arranged equidistant from each other.

6. A joint for coupling a side arm to a frame of a pair of glasses, said joint comprising:
    a post configured to be secured to one of said side arm or said frame, said post includes a shaft and an enlarged head at a distal end of said shaft;
    a plurality of prongs configured to be secured to the other of said side arm or said frame and define a socket configured to receive at least a portion of said enlarged head of said post, said plurality of prongs configured to apply a compressive force against said enlarged head of said post;
    a base, wherein said plurality of prongs extend from said base; and
    a nut configured to generate said compressive force applied by said plurality of prongs;
    wherein said base further includes a threaded region configured to engage with a threaded region of said nut.

7. The joint of claim 6, wherein said base comprises a flange and a projection extending generally outwardly from said flange, wherein said flange has a larger cross-section than said projection.

8. The joint of claim 7, wherein an outer surface of said projection includes said threaded region.

9. The joint of claim 8, wherein said nut includes a projection extending from a flange, said projection including a generally cylindrical internally threaded region configured to threadably engage with said threaded region of said projection of said base.

10. The joint of claim 9, wherein said flange includes a generally circular opening with smaller cross-section compared to said projection, wherein said generally circular opening is configured to apply said compressive force against said plurality of prongs as said nut is threaded.

11. A pair of glasses comprising:
a frame configured to retain one or more lenses;
at least one side arm; and
a joint coupling said at least one side arm to said frame, said joint configured to allow said at least one side arm to pivot about at least two axes, said joint comprising:
a post;
a plurality of prongs configured to apply a compressive force against said post, wherein at least a portion of at least one of said plurality of prongs includes a threaded region; and
a threaded nut configured to engage said threaded region to adjust said compressive force;
wherein one of said post or said plurality of prongs is configured to extend from said frame and the other of said post or said plurality of prongs being configured to extend from said at least one side arm.

12. The pair of glasses of claim 11, wherein said post includes a shaft and an enlarged head at a distal end of said shaft.

13. The pair of glasses of claim 12, wherein said plurality of prongs define a socket configured to receive at least a portion of said enlarged head of said post.

14. The pair of glasses of claim 12, wherein said plurality of prongs are configured to apply the compressive force against said enlarged head.

15. The pair of glasses of claim 14, wherein said plurality of prongs each include an enlarged head configured to collectively define said socket.

16. The pair of glasses of claim 14, wherein said plurality of prongs each include a recessed region configured to collectively define said socket.

17. The pair of glasses of claim 11, wherein said joint further comprises:
a threaded collar configured to engage said threaded region and engage against said nut to form a locking effect; and
a spacer defining one or more passageways through which said plurality of prongs extend therethrough, wherein said spacer generally maintains an alignment of said plurality of prongs.

* * * * *